United States Patent [19]
Moffitt et al.

[11] Patent Number: 5,735,670
[45] Date of Patent: Apr. 7, 1998

[54] ROTOR SYSTEM HAVING ALTERNATING LENGTH ROTOR BLADES AND POSITIONING MEANS THEREFOR FOR REDUCING BLADE-VORTEX INTERACTION (BVI) NOISE

[75] Inventors: Robert C. Moffitt, Seymour; David G. Matuska, Huntington, both of Conn.; Evan A. Fradenburgh, New London, N.H.

[73] Assignee: Sikorsky Aircraft Corporation, Stratford, Conn.

[21] Appl. No.: 569,390

[22] Filed: Dec. 11, 1995

[51] Int. Cl.⁶ .................................................. B64C 11/28
[52] U.S. Cl. ........................ 416/87; 416/89; 416/203; 415/119
[58] Field of Search .......................... 416/87, 88, 89, 416/101, 175, 201 A, 203; 415/119

[56] References Cited

U.S. PATENT DOCUMENTS

| | | | |
|---|---|---|---|
| 1,922,866 | 8/1933 | Rosenberg et al. | 416/88 |
| 2,510,216 | 6/1950 | Figley | 416/88 |
| 3,128,829 | 4/1964 | Young | 416/88 |
| 3,713,751 | 1/1973 | Fradenburgh et al. | |
| 3,768,923 | 10/1973 | Fradenburgh | |
| 3,884,594 | 5/1975 | Fradenburgh | |
| 4,007,997 | 2/1977 | Yarm | |
| 4,142,697 | 3/1979 | Fradenburgh | |
| 5,253,979 | 10/1993 | Fradenburgh et al. | |

OTHER PUBLICATIONS

Stanley Martin, Jr., and George Hall, Rotor Will Retract in Flight to improve Vtol Cruise Performance, from Space/Aeronautics, Nov. 1969.

J.C. Hardin, S.L. Lamkin, AIAA-86-1855 Concepts for Reduction of Blade-Vortex Interaction Noise, presented at AIAA 10th Aeroacoustics Conference Jul. 9-11, 1986/Seattle, Washington.

Thomas F. Brooks, Studies of Blade-Vortex Interaction Noise Reduction By Rotor Blade Modification, from Noise-Con 93, Williamsburg, Virginia, May 2-5, 1993.

Lyrintzis, A.S., Koutsavdis, E.K., Berezin, C.R., Visintainer, J.A. and Pollack, M.J., Kirchhoff Acoustic Methodology Validation and Implementation in the Tiltrotor Aeroacoustic Codes (TRAC), presented at the 2nd AHS Aeromechanics Specialist Conference, Bridgeport, CT, Oct. 11-13, 1995.

*Primary Examiner*—Edward K. Look
*Assistant Examiner*—Christopher Verdier
*Attorney, Agent, or Firm*—Brian A. Collins

[57] ABSTRACT

A Variable Diameter Rotor (VDR) system (4) having telescoping odd and even blade assemblies ($O_b$, $E_b$) wherein the odd blade assemblies define a radial length $R_O$ and the even blade assemblies define a radial length $R_E$. Each blade assembly ($O_b$, $E_b$) defines an internal chamber (64) for accepting a positioning means (70) operative to effect telescopic translation of the blade assemblies ($O_b$, $E_b$) such that the radial length $R_E$ of the even blade assemblies ($E_b$) is equal to the radial length $R_O$ of the odd blade assemblies ($O_b$) in a first operating mode, and such that the radial length $R_E$ is between about 70% to about 95% of the length $R_O$ in a second operating mode. The positioning means (70) includes a centrifugal restraint assembly (80) disposed within each internal chamber (64) of the rotor blade assemblies ($O_b$, $E_b$), a stop surface (64s) formed internally of each internal chamber (64), and an actuation means (90) operative for transpositioning the centrifugal restraint assemblies (80) within the internal chambers (64) such that, in one operating mode, the centrifugal restraint assemblies (80) are disposed in abutting engagement with the stop surfaces (64s) and, in another operating mode, the actuation means (90) is disposed in abutting engagement with the centrifugal restraint assemblies (80) of at least one of the blade assemblies ($O_b$, $E_b$).

23 Claims, 14 Drawing Sheets

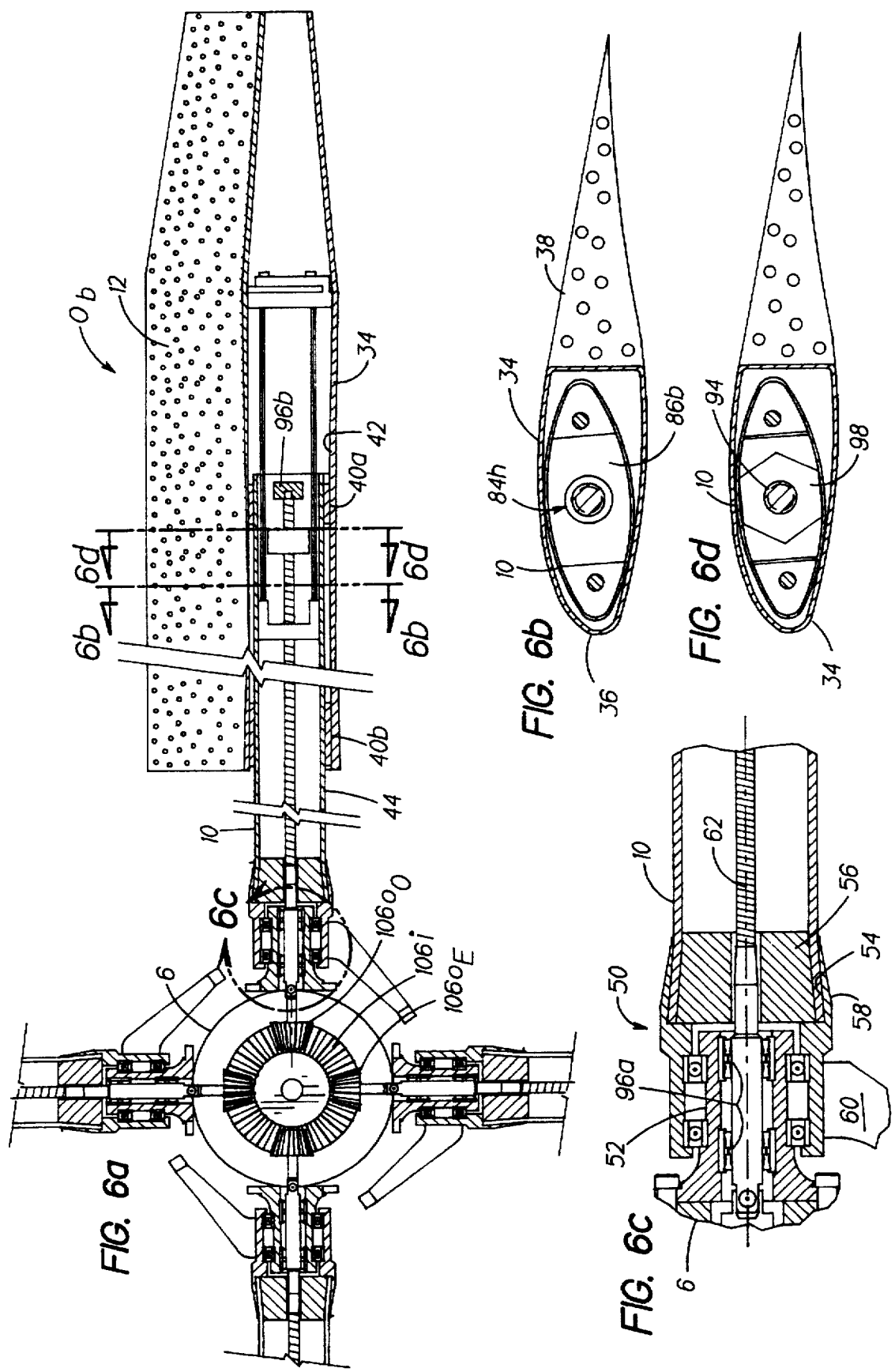

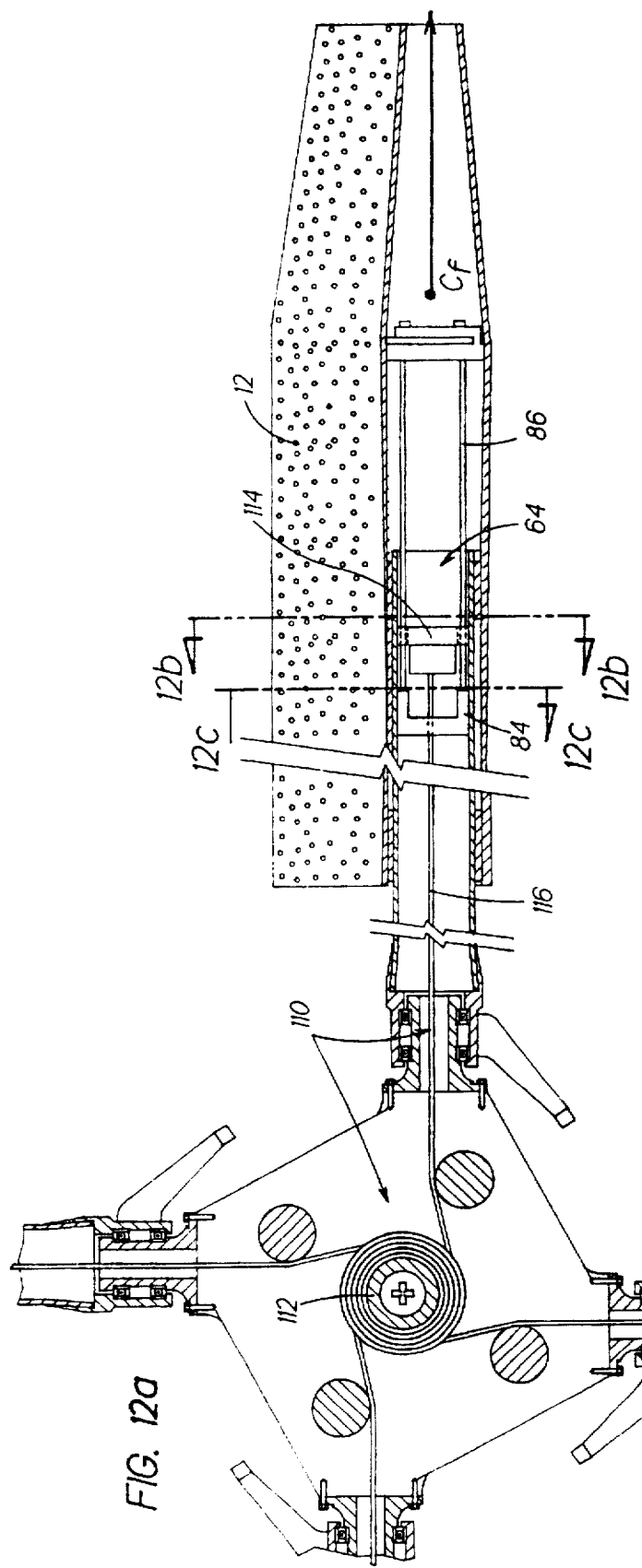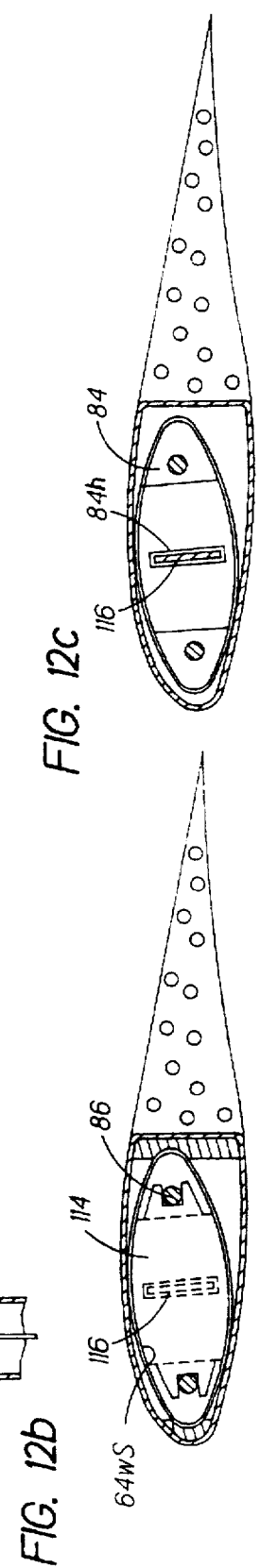
FIG. 12a
FIG. 12b
FIG. 12c

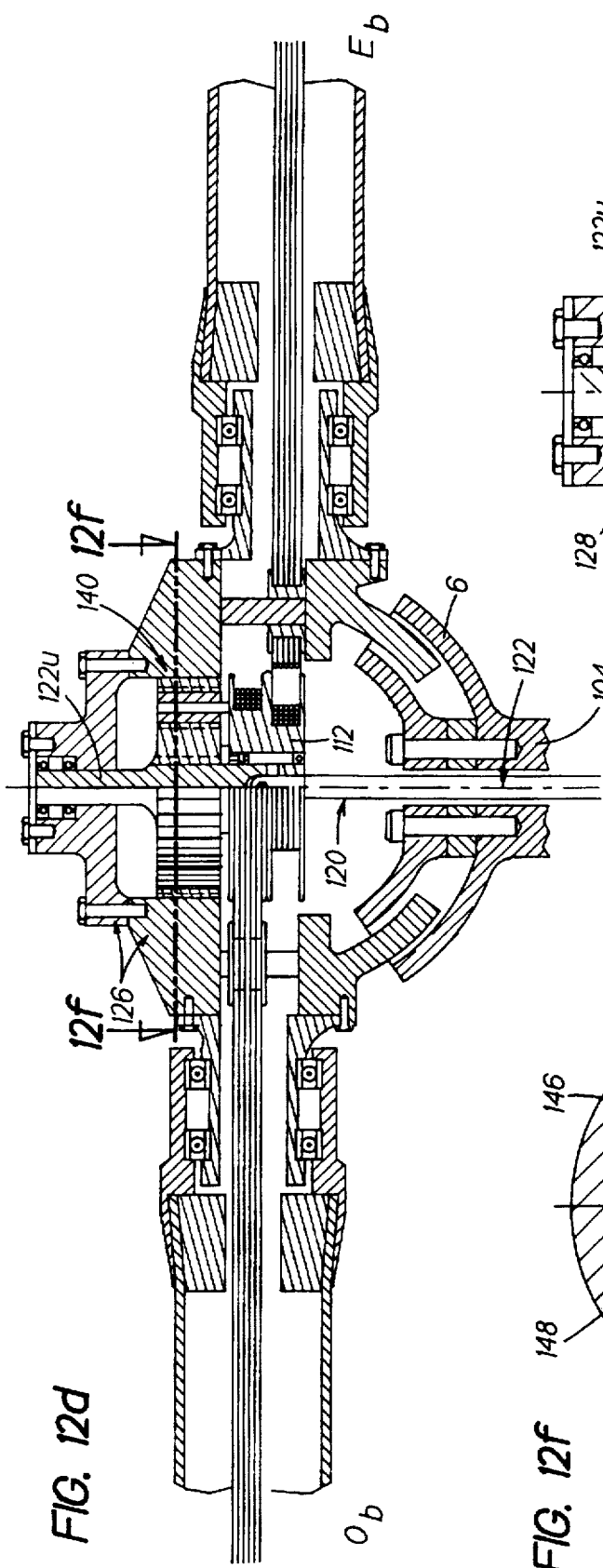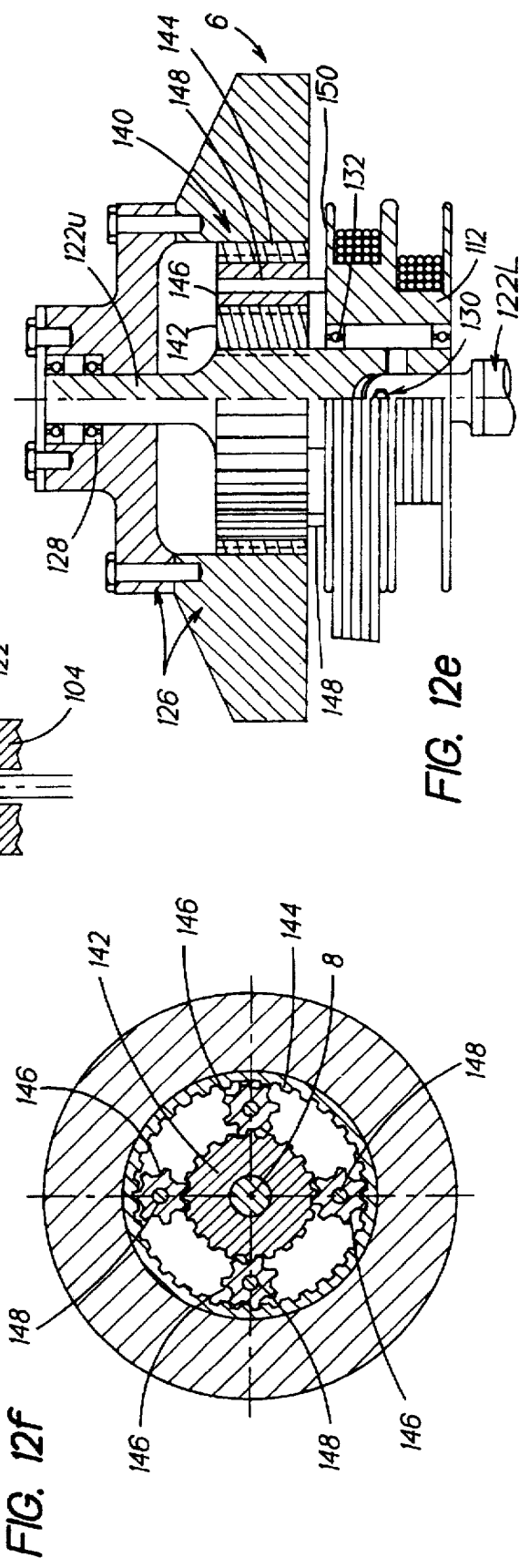
FIG. 12d
FIG. 12e
FIG. 12f

ROTOR SYSTEM HAVING ALTERNATING LENGTH ROTOR BLADES AND POSITIONING MEANS THEREFOR FOR REDUCING BLADE-VORTEX INTERACTION (BVI) NOISE

TECHNICAL FIELD

The present invention is directed to means for reducing the noise radiated from the rotor blades of rotorcraft, and, more particularly, to means for reducing Blade-Vortex Interaction (BVI) noise radiated from such rotor blades when operating in flight modes which produce high levels of BVI noise.

BACKGROUND OF THE INVENTION

One concern of rotorcraft designers is to reduce, to the extent practicable, the noise radiating from the rotor blades during flight operations. In particular, landing approaches which are characterized by a low speed, descending flight profile produce significant noise levels due to acoustic emissions known as Blade-Vortex Interaction (BVI). Insofar as such flight profile typically occurs at low altitude and over populated areas, BVI noise presents a primary technical issue which must be resolved to obtain community acceptance, and, more importantly, certification of newly-developed rotorcraft.

During typical rotorcraft flight operations, the rotor blades create a high velocity, low pressure field over the upper aerodynamic surface thereof and a low velocity, high pressure field over the lower aerodynamic surface. The pressure differential generates the necessary lift forces for flight operations but, additionally, effects the generation of vortices at the tips of the rotor blades. More specifically, the pressure differential engenders airflow circulation from the high pressure field to the low pressure field to create a tip vortex. A tip vortex is shed from one rotor blade and impinges/interacts with a subsequent rotor blade as it rotates through the vortex field. The interaction of a tip vortex with a rotor blade induces impulsive airloading which creates an acoustic pressure wave that is the source of BVI noise.

BVI noise is generally not a concern in ascending or cruise flight modes inasmuch as the rotor disk, i.e., the plane defined by the rotor blades, moves away from the vortex wake. Consequently, the vortices are distally spaced from the rotor and do not significantly interact therewith. BV Interactions are most prevalent, however, during descent modes of operation, insofar as the downward velocity of the rotorcraft causes the rotor to fly into its wake thus interacting with multiple vortices.

The trajectory and core strength of vortices are difficult to predict; however, it may be generally stated that the vortices move downward in a spiral pattern as a function of the speed and flight attitude of the rotorcraft, the boundary conditions imposed by the fuselage, the turbulence of the atmosphere, and other factors such as the lift-time history of each rotor blade. Generally, BV Interactions which occur in the first quadrant of the rotor disk (0 degrees being positionally aft of the rotor shaft axis and along the longitudinal axis of the rotorcraft) generate strong BVI impulses due to the combined rotational velocity of the rotor blades and the forward flight velocity of the rotorcraft. Furthermore, the probability for strong interactions is intensified due to the high concentration and strength of vortices in this quadrant.

Another factor which influences the strength of the BV Interactions includes the orientation of the rotating vortex with respect to the impinging rotor blade. The orientation of the vortex is defined by the angle of intersection between the leading edge of the rotor blade and the centerline of the vortex, i.e., vortex core. When the orientation is substantially parallel with respect to the rotor blade leading edge, the circulatory flow of the vortex affects a large portion of the blade length, and, consequently, excites large impulsive pressure waves. Orientations which are substantially perpendicular or oblique to the leading edge produce relatively benign interactions by limiting the blade spanwise extent that is exposed to the circulatory flow.

Yet another factor which determines the strength of BVI encounters is the spatial separation between the rotating vortex and a passing/intersecting rotor blade. The spatial separation may be more accurately defined as the distance from the vortex core to a point on the leading edge of the rotor blade. Insofar as the airflow velocity at a point in the vortex field is a function of $1/R$, wherein R is the distance from the vortex core, it will be apparent that the airflow velocity, in theory, becomes infinite ($\infty$) as R approaches zero (0) and diminishes at a precipitous rate as the distance R increases. Accordingly, when the spatial separation is small, e.g., less than the thickness of the rotor blade, the rotating vortex field will significantly impact the circulation about the rotor blade thereby producing large BVI impulses. Conversely, when the separation is larger, e.g., 5X the thickness of the rotor blade, the BVI impulse is substantially reduced due to the precipitous decline of vortex field velocity at the point of rotor blade intersection.

The rotorcraft designer, therefore, attempts, to the extent practicable taking into account, inter alia, weight, cost, performance, and system complexity, to incorporate elements into the rotor assembly that mitigate the BVI noise radiated therefrom. There are several different design options to mitigate BVI radiated noise. These approaches may be grouped into three broad categories, namely, passive systems, deployable passive systems and active systems.

Passive systems attempt to reduce BVI noise by favorably altering rotor blade geometry or rotor operating parameters. Examples of passive systems include selective tip shaping to diffuse or weaken the vortex. One design option involves a forward swept tip wherein the vortex is generated inboard of the tip, such inboard generated vortex being more diffuse, i.e., reduced in strength, than the tip vortex generated by a conventional rectangular tip. Another design configuration is a sub-wing tip wherein a sub-wing is attached to the rotor blade at the tip thereof to produce two weak, corotating vortices that mix downstream and diffuse due to viscous effects. Yet another design approach involves reducing tip speed, below about 675 ft/sec (206 m/sec), or increasing the number of blades to reduce blade loading, and, consequently, the strength of the tip vortex. These design options provide marginal improvement in mitigating BVI noise, e.g., on the order of about 2 to 5 dBa reduction and, furthermore, often degrade the overall operating efficiency of the rotor system. Furthermore, such design options may be difficult and/or costly to implement.

Deployable passive systems alter the rotor blade geometry in flight by deploying a noise reduction device during modes of operation which produce high levels of BVI noise. Examples of deployable passive systems include half-plow vortex generators which are disposed along the upper or lower surface of a rotor blade and are deployable when the rotorcraft is in a descending flight profile. Similar to the sub-wing tip discussed above, the half-plow vortex generators produce two or more vortices of reduced strength in an attempt to disrupt the formation of a single, more potent, tip vortex. While such vortex generation/deployable devices are generally effective in reducing BVI noise, performance penalties and/or mechanical complexities are impediments to the widespread acceptance of deployable passive systems.

Active systems effect noise control by continuously modifying the pitch or angle of attack of a rotor blade azimuthally about the rotational axis. This may be accomplished via selective control inputs by pitch control actuators or through blade mounted control surfaces which receive control inputs from a closed- or open-loop feedback control system. More specifically, the control system senses vibration/noise via a plurality of accelerometers/microphones and provides higher order control inputs to the control actuators/control surfaces to pitch the rotor blade at selected higher harmonic frequencies. The higher harmonic blade excursions effect vibration/noise reduction by influencing the trajectory and/ or strength of the interfering vortex, and/or producing pressure waves that directly cancel the BVI pressure impulse. One example of an active system includes oscillating flaps disposed along the trailing edge of a rotor blade to provide a means of actively controlling the angle of attack of the rotor blade. Another example involves channeling air to the tip of a rotor blade and expelling such air to disrupt the formation of the tip vortex. Active systems are, perhaps, the most effective in mitigating the BVI noise when compared to passive and deployable passive systems, however, active systems are the most disadvantageous in terms of incurred weight penalties, complexity, reliability and related fail-safe issues.

A need, therefore, exists to provide a means to significantly reduce the BVI noise radiated from rotor systems which does not significantly degrade the operating efficiency thereof, e.g., lift capacity or power requirements, and does not significantly increase the weight, or mechanical complexity of the rotor system.

SUMMARY OF THE INVENTION

It is an object of the present invention to provide a Variable Diameter Rotor (VDR) system for reducing BVI noise which VDR system includes telescoping rotor blade assemblies and a positioning means for controlling the length of the rotor blade assemblies such that the rotor blade assemblies are fully-extended in a first operating mode for optimal aerodynamic performance, and alternately vary in blade length in a second operating mode for optimal acoustic performance, i.e., BVI noise reduction.

It is yet another object of the present invention to provide a VDR system in combination with a tilt rotor aircraft for reducing BVI noise which VDR system includes telescoping rotor blade assemblies and a positioning means for controlling the length of the rotor blade assemblies such that the rotor blade assemblies are extended in a first operating mode for optimal hover performance, alternately vary in blade length in a second operating mode for optimal acoustic performance, and are retracted in a third operating mode for optimal forward flight performance.

It is yet another object of the present invention to provide a VDR system for reducing BVI noise which VDR system includes telescoping rotor blade assemblies and a positioning means for controlling the length of the rotor blade assemblies, which positioning means does not adversely impact the weight and/or mechanical complexity of the VDR system.

These and other objects are achieved by a Variable Diameter Rotor (VDR) system having telescoping odd and even blade assemblies wherein the odd blade assemblies define a radial length $R_O$ and the even blade assemblies define a radial length $R_E$. Each blade assembly, furthermore, defines an internal chamber for accepting a positioning means operative to effect telescopic translation of the blade assemblies such that the radial length $R_E$ of the even blade assemblies is equal to the radial length $R_O$ of the odd blade assemblies in a first operating mode, and such that the radial length $R_E$ is between about 70% to about 95% of the length $R_O$ in a second operating mode.

The positioning means includes a centrifugal restraint assembly disposed within each internal chamber of the rotor blade assemblies, a stop surface formed internally of each internal chamber, and an actuation means operative for transpositioning the centrifugal restraint assemblies within the internal chambers such that, in one operating mode, the centrifugal restraint assemblies are disposed in abutting engagement with the stop surfaces and, in another operating mode, the actuation means is disposed in abutting engagement with the centrifugal restraint assemblies of at least one of the blade assemblies.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 6a depicts a plan view of a VDR blade assembly having inboard and outboard blade sections which are broken-away and sectioned to reveal an internal positioning means for varying blade length;

FIG. 6b is a cross-sectional view taken substantially along line 6b—6b of FIG. 6a;

FIG. 6c is an enlarged view of the root end portion of the blade assembly of FIG. 6a;

FIG. 6d is a cross-sectional view taken substantially along line 6d—6d of FIG. 6a;

FIG. 12a depicts a broken-away top view of a telescoping rotor blade wherein the positioning means employs a reeling assembly having end fixities for engaging or disengaging the centrifugal restraint assembly;

FIG. 12b is a cross-sectional view taken substantially along line 12b—12b of FIG. 12a;

FIG. 12c is a cross-sectional view taken substantially along line 12c—12c of FIG. 12a;

FIG. 12d depicts a broken-away and partially sectioned side view of the reeling assembly in combination with an overhead planetary gear system for driving the reeling assembly;

FIG. 12e is an enlarged view of the overhead planetary gear system which is operative for driving a cylindrical drum of the reeling assembly;

FIG. 12f is a cross-sectional view taken substantially along lines 12f—12f of FIG. 12d;

BEST MODE FOR CARRYING OUT THE INVENTION

Figure 1:
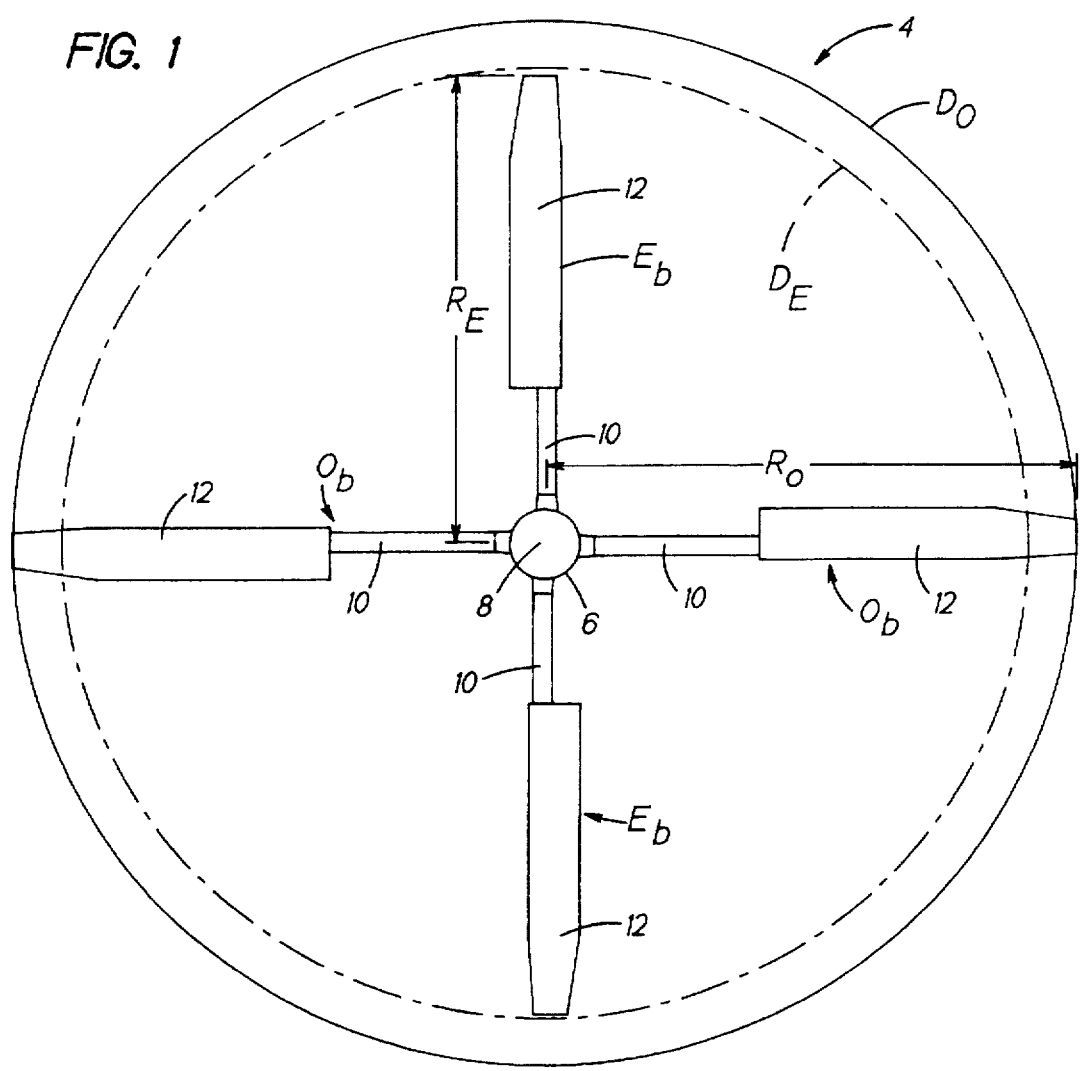
FIG. 1 is a top view of a VDR system in accordance with the present invention wherein odd and even rotor blade assemblies thereof alternately vary in length about the azimuth of the rotor system.

Referring now to the drawings wherein like reference characters identify corresponding or similar elements throughout the several views, FIG. 1 depicts a plan view of a four-bladed VDR system 4 having a rotor hub assembly 6 mounting to and driving odd and even rotor blade assemblies $O_b$ and $E_b$, respectively, about an axis of rotation 8. While the described embodiment depicts a four-bladed VDR system 4, the invention is also applicable to rotor systems having an even number of rotor blade assemblies in excess of four, e.g., 6 or 8 rotor blade assemblies. The odd and even blade assemblies $O_b$, $E_b$ of the VDR system 4 each include inboard and outboard blade sections 10 and 12, respectively, wherein the outboard blade section 12 telescopically mounts to the inboard blade section 10. Furthermore, the telescoping rotor blade assemblies $O_b$, $E_b$ alternate in radial length about the azimuth of the rotational axis 8 such that the tip path of the odd and even rotor blade assemblies $O_b$ and $E_b$ define two distinct rotor diameters $D_O$, and $D_E$, respectively. The positioning means for alternating blade length are described in detail below, however, suffice it to say that the telescopic translation of the odd and even blade assemblies $O_b$, $E_b$ may be controlled to vary the radial length of each.

Each odd blade assembly $O_b$, defines a radial length $R_O$ which may be further defined as the fully-extended blade radius of the VDR system 4, i.e., the maximum permissible length of the telescoping inboard and outboard blade sections 10, 12. Each even blade assembly $E_b$ defines a radial length $R_E$ which may be further defined as a percentage of the radial length $R_O$ of each odd blade assembly $O_b$. Preferably, the radial length $R_E$ is between a range of about 70% to about 95% of radial length $R_O$ and, more preferably, the radial length $R_E$ is between about 82% to about 95% of radial length $R_O$. The functional significance of the selected ranges will become apparent in view of the following discussion.

Figure 2A:
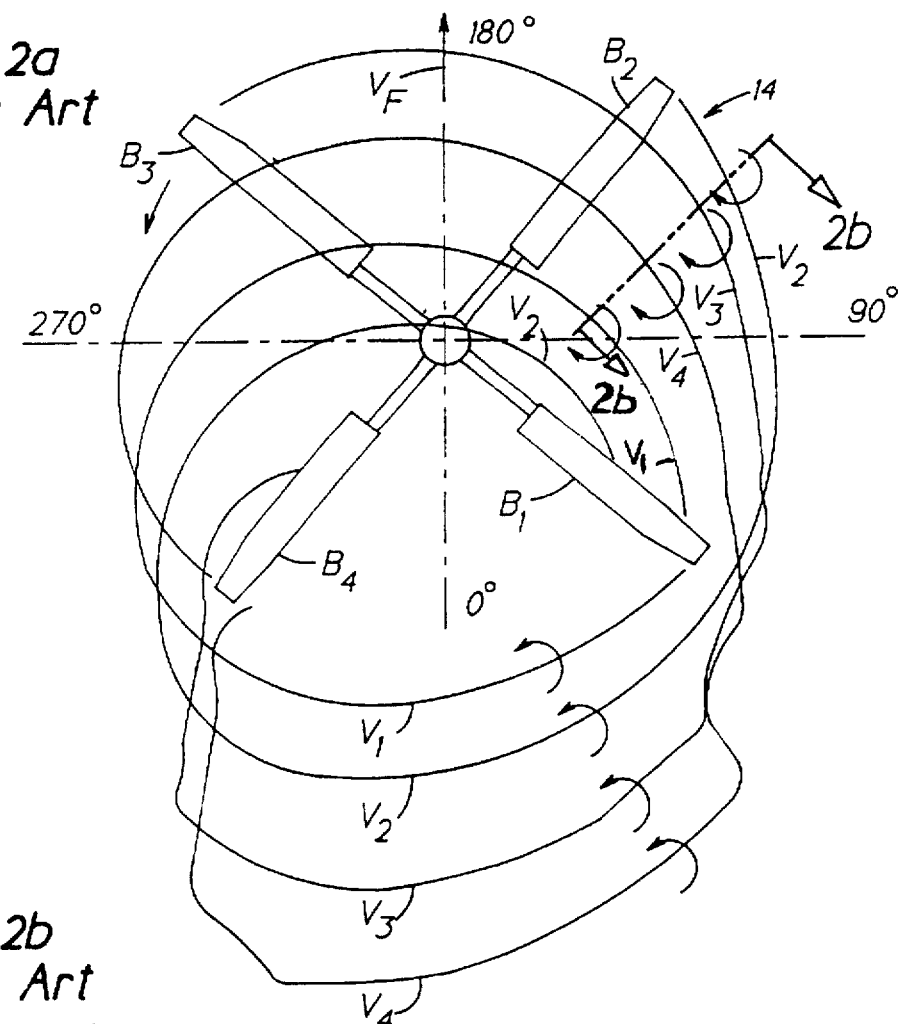
FIG. 2a depicts a two dimensional top view of the vortices shed by the rotor blade assemblies of a conventional rotor system.
Figure 2B:
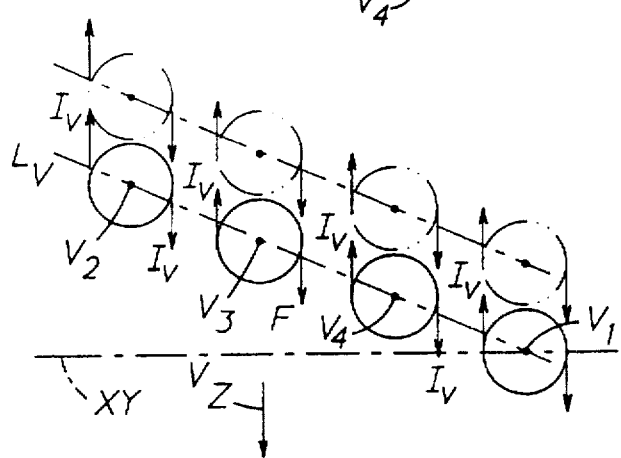
FIG. 2b is a section view along a vertical plane 2b of FIG. 2a, depicting the interaction of vortices of the conventional rotor system, and the spatial positioning of the vortices over time due to such interaction.
Figure 2C:
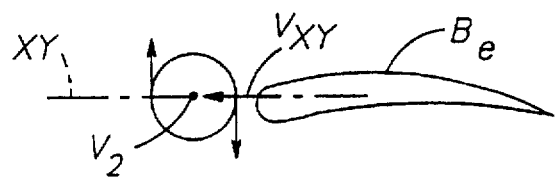
FIG. 2c depicts a vortex of the conventional rotor system interacting with a blade element thereof.

In FIGS. 2a–2c and FIGS. 3a–3c, the BV Interactions of a conventional, uniform blade length rotor system 14 are compared and contrasted with those of the alternating blade length VDR system 4 of the present invention. In FIG. 2a, the rotor blades $B_1$–$B_4$ of the conventional rotor system 14 produce vortices $V_1$–$V_4$ which are plotted over a period of one revolution. As shown, the rotor system 14 is moving forward at a velocity $V_F$ and in a descending flight profile. The two dimensional vortex plot shows a high concentration of vortices $V_1$–$V_4$ in the first quadrant of the rotor system 14 i.e., between 0 and 90 degrees. In FIG. 2b, the vortices $V_1$–$V_4$, are shown in section through a vertical plane 2b located in the second quadrant. Initially, the vortices $V_1$–$V_4$ are above the plane XY of the rotor, and are moving downward at velocity $V_Z$. Furthermore, the vortices $V_1$–$V_4$, are rotating in a clockwise direction and are substantially equally-spaced with respect to one another i.e., in both horizontal and vertical directions. As time advances, the vortices $V_1$–$V_4$ interact such that they remain in substantially collinear alignment, i.e., along line $L_V$, as the vortices $V_1$–$V_4$ progress in a downward direction. That is, the alternating upward and downward circulation of the vortices $V_1$–$V_4$ produce induced velocity vectors $I_v$ which are substantially equal and opposite, thereby maintaining the vertical spacing between the vortices $V_1$–$V_4$. Such uniform vertical spacing creates a high probability that a subsequent rotor blade will interact with one of the Vortices $V_1$–$V_4$. FIG. 2c depicts a typical BV interaction in the first quadrant wherein the Vortex $V_2$ is in close proximity to a blade element $B_e$ of rotor blade $B_1$ and is substantially parallel thereto. As discussed in the "Background of the Invention" such close proximity, parallel interactions result in high BVI noise.

Figure 3A:
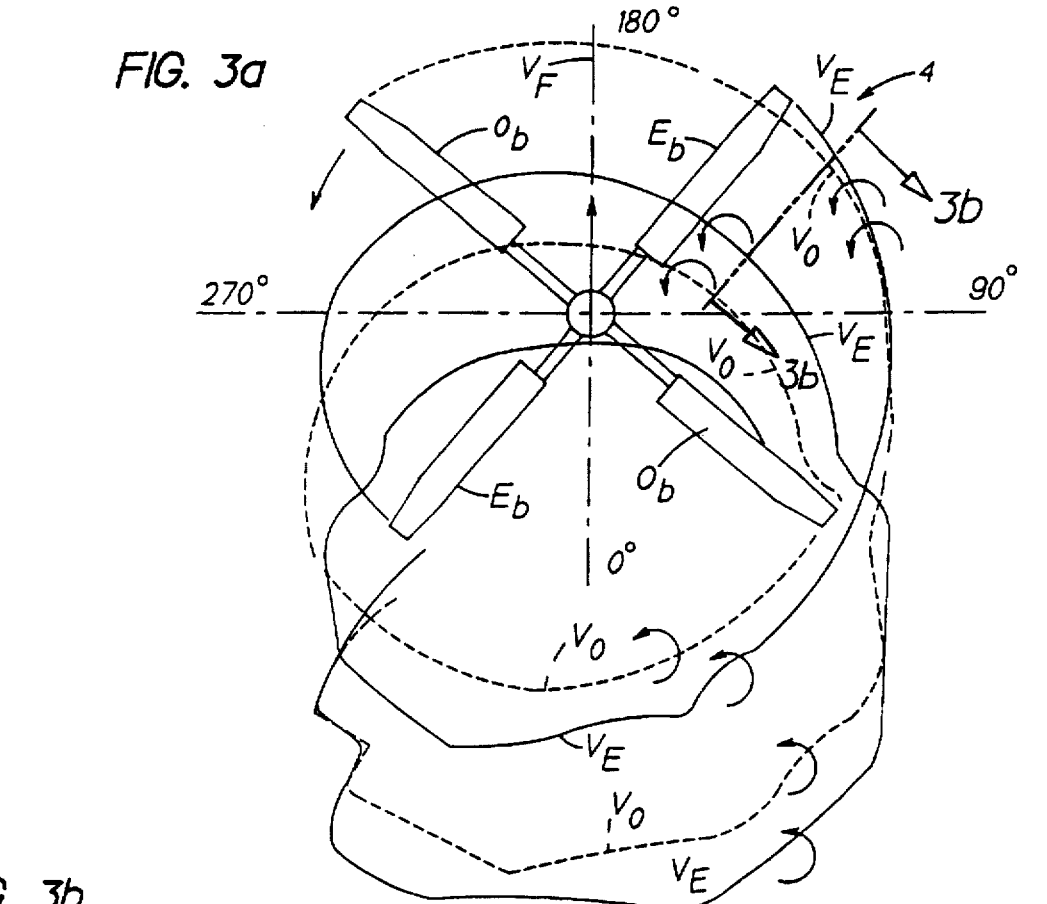
FIG. 3a depicts a two dimensional top view of the vortices shed by the rotor blade assemblies of the rotor system according to the present invention.
Figure 3B:
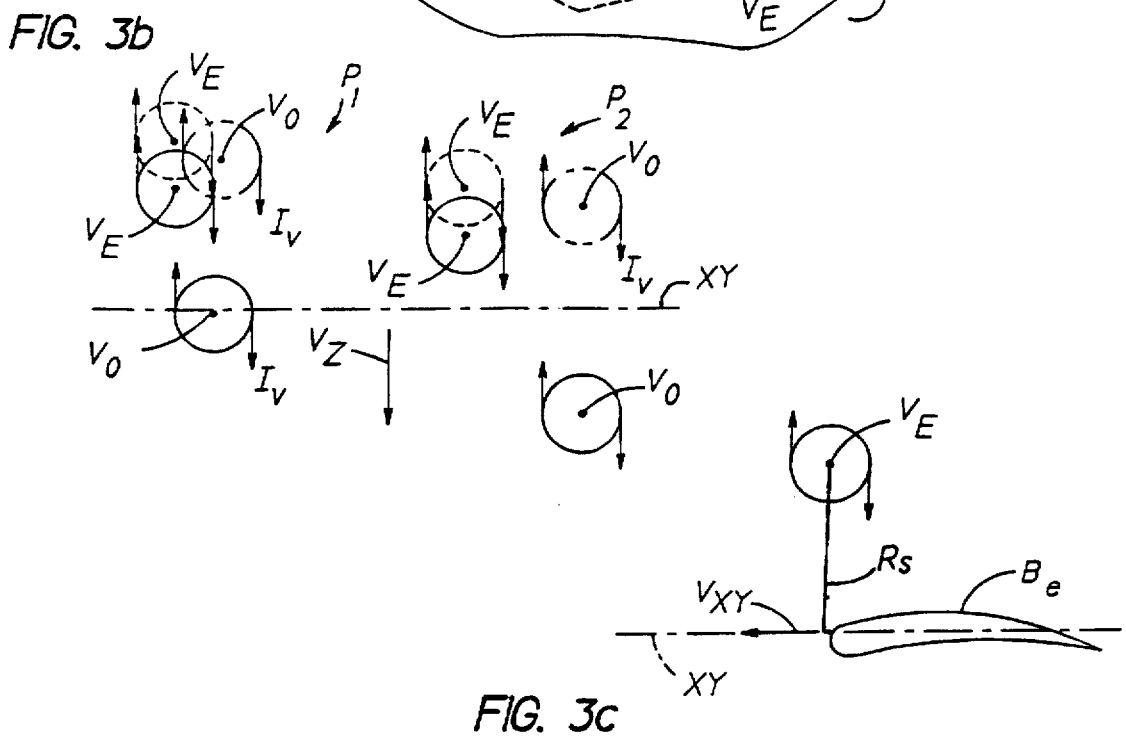
FIG. 3b is a section view along a vertical plane 3b of FIG. 3a, depicting the interaction of vortices of the conventional rotor system, and the spatial positioning of the vortices over time due to such interaction.
Figure 3C:
FIG. 3c depicts vortices of the rotor system according to the present invention and a blade element thereof passing above or below the vortices.

In FIGS. 3a–3c, the odd and even rotor blade assemblies $O_b$ and $E_b$ of the VDR system 4 according to the present invention produce vortices $V_O$ and $V_E$, respectively. The same flight conditions and views are shown as those depicted in FIGS. 2a–2c, however, the trajectory and spatial separation of the vortices $V_O$ and $V_E$ are altered due to the variation of blade length. More specifically, and referring to FIG. 3b, the vortices $V_O$, $V_E$ are initially clustered in closely spaced pairs $P_1$ and $P_2$, wherein the pairs $P_1$, $P_2$ are distally spaced in a horizontal direction. As time advances, the vortices $V_O$, $V_E$ of each pair $P_1$, $P_2$ interact to effect an increased spatial separation in a vertical direction. That is, the horizontal separation of the vortex pairs $P_1$, $P_2$ causes the induced velocity vectors $I_v$ to influence each pair $P_1$, $P_2$ independently, i.e., without influencing each other. The induced velocity $I_v$ causes the vortices $V_O$, $V_E$ of each pair to separate vertically, i.e., by impeding the downward progression of vortices $V_E$ while accelerating the downward motion of vortices $V_O$. While it may have been expected that the vortices $V_O$, $V_E$ of each pair $P_1$, $P_2$ should rotate about one another without effecting a vertical separation, additional factors such as the proximity of each vortex pair $P_1$, $P_2$ to prior generated vortices and the curvature/orientation of the vortices $V_O$, $V_E$ combine to produce the phenomena described above. As shown in FIG. 3c, the spatial separation causes the blade element $B_e$ to pass above or below the vortices $V_O$, $V_E$ by a distance $R_s$, wherein $R_s$ is at least 5X the thickness of the blade element. As discussed earlier, such spatial separation results in substantially benign BV Interactions.

Figure 4A:
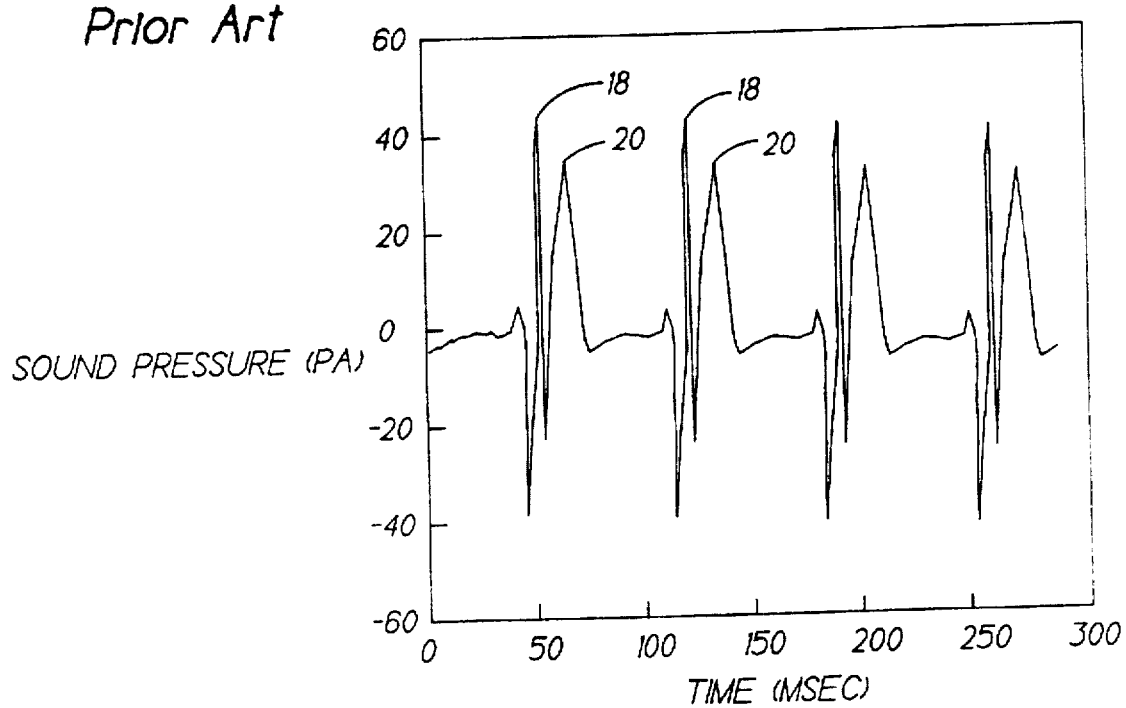
FIG. 4a is a graphical representation of an acoustic pressure profile illustrating the magnitude of BVI noise radiated from the conventional rotor system.
Figure 4B:
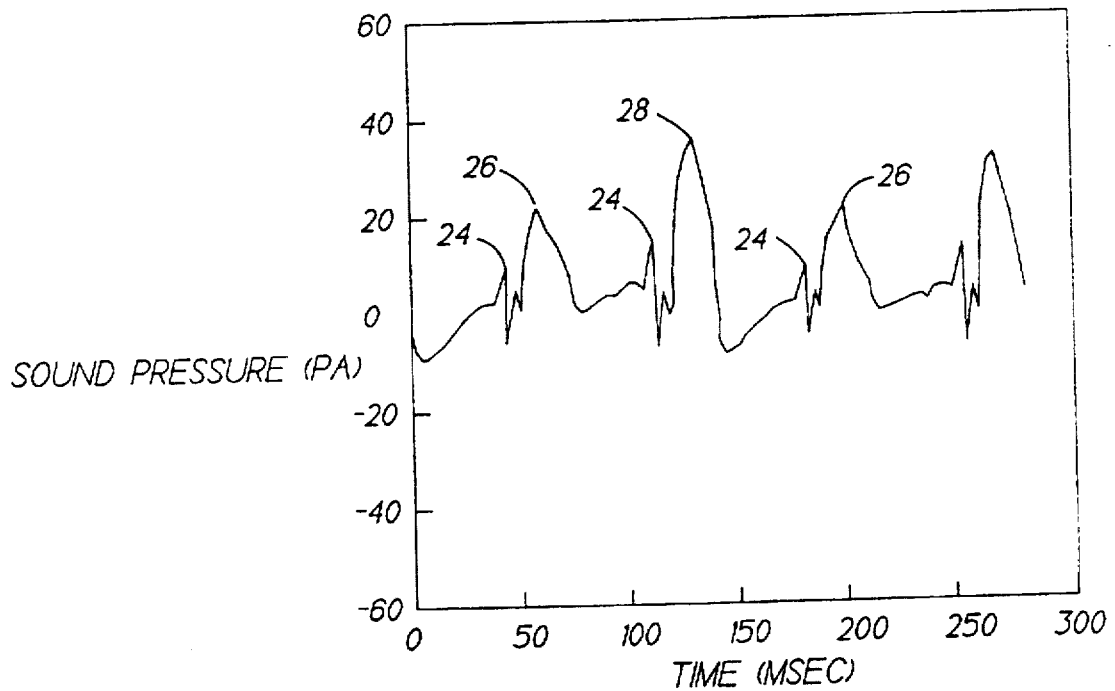
FIG. 4b is a graphical representation of an acoustic pressure profile illustrating the magnitude of BVI noise radiated from the rotor system of the present invention.

FIGS. 4a and 4b graphically depict the acoustic pressure profiles of the conventional rotor system 14 and the VDR system 4 of the present invention. In FIG. 4a, the conventional rotor system 14 produces rapid pressure fluctuations 18 having min and max values from about −40 PA (−8.4 lb/ft$^2$) to about +40 PA (+8.4 lb/ft$^2$), respectively, over a 1–3 msec time interval. The pressure fluctuations 18 are indicative of high impulsive pressure waves which are the source of BVI noise. Secondary spikes 20 are indicative of pressure waves generated by blade loading, e.g., lift, and are less offensive to the human ear due to the longer time interval, i.e., 20–25 msec, over which such fluctuations occur. In FIG. 4b, the VDR system of the present invention produces substantially reduced BVI impulses 24 which fluctuate from about −10 PA (−2.2 lb/ft$^2$) to +10 PA (+2.2 lb/ft$^2$). Secondary spikes 26 and 28 are indicative of the blade loading on the even and odd blade assemblies $O_b$ and $E_b$, respectively, and fluctuate in magnitude due to the alternating blade length. When comparing the BVI components of pressure in FIGS. 4a and 4b, and converting the same to the frequency domain, a 10–16 dBa reduction in BVI noise is achieved when employing the teachings of the present invention.

The VDR system of the present invention may be reconfigured in various modes of flight operation for maximum aerodynamic and acoustic performance. For example, all blade assemblies $O_b$, $E_b$ thereof may be fully-extended and uniform in length, in a first operating mode corresponding to hover or forward flight operations. In this configuration, the rotor disk area is maximized for optimum aerodynamic performance. Furthermore, the blade assemblies $O_b$, $E_b$ may be selectively positioned for alternating blade length in a second operating mode corresponding to descending flight operations. In this configuration, BVI noise is mitigated for maximum acoustic performance.

APPLICATION TO TILT ROTOR AIRCRAFT

While the present invention is useful in combination with VDR systems in general, its application to tilt rotor aircraft provides a considerable opportunity for BVI noise reduction. A tilt rotor aircraft is a type of rotorcraft which employs a pair of rotor systems which are supported at the outermost end of a wing structure and are pivotable such that the rotors thereof may assume a vertical or horizontal orientation. In a horizontal orientation, the aircraft is capable of hovering flight, while in a vertical orientation, the aircraft is propelled in the same manner as conventional propeller-driven fixed-wing aircraft.

Currently, tilt rotor aircraft employ conventional fixed-diameter rotor systems which, in the aerodynamic, acoustic and aeroelastic design thereof, attempt to blend the competing requirements of hovering and forward flight modes of operation. For example, with regard to hovering flight, it is generally advantageous to employ a large diameter rotor to improve hovering performance by lowering disk loading, reducing BVI noise levels, and reducing downwash velocities. Conversely, a relatively small diameter rotor is desirable in forward flight to improve propulsive efficiency by minimizing blade aeroelastic properties, minimizing blade area, and reducing tip speed (Mach number). Within the constraints of a fixed-diameter rotor system, these requirements necessitate that design compromises be made which result in non-optimum aerodynamic and acoustic performance. With regard to acoustic performance, high blade loading in descending flight modes produces highly vexatious BVI noise.

Variable Diameter Rotor (VDR) systems are known to provide distinct advantages over conventional fixed-diameter rotors insofar as such systems are capable of adaptation to both modes of operation. That is, when the plane of the rotor is oriented horizontally, the rotor diameter is enlarged for improved hovering efficiency and, when oriented vertically, the rotor diameter is reduced for improved propulsive efficiency. Tilt rotor aircraft which employ VDR systems are described and depicted in U.S. Pat. Nos. 3,768,923, 4,142,697, and 5,253,979. VDR systems for use in combination with tilt rotor aircraft provide a reduction in blade loading and, consequently, a degree of BVI noise reduction. Further improvements, however, are achievable when employing the teachings of the present invention.

Figure 5A:
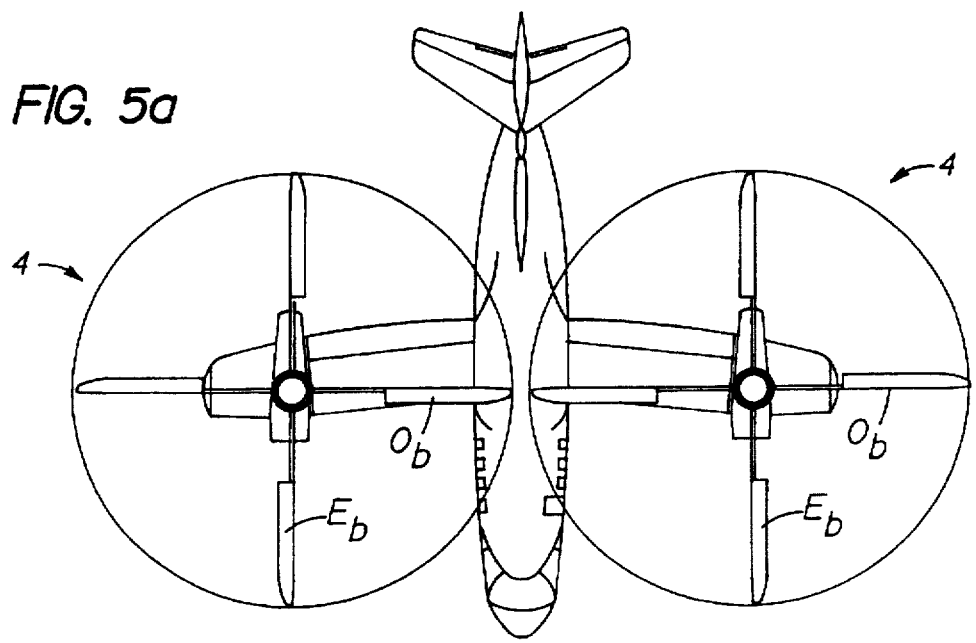
FIGS. 5a–5c depict a tilt rotor aircraft in combination with a pair of VDR systems wherein the odd and even blade assemblies are extended in a first operating mode (FIG. 5a), alternately vary in blade length in a second operating mode (FIG. 5b) and are retracted in a third operating mode (FIG. 5c)
Figure 5B:
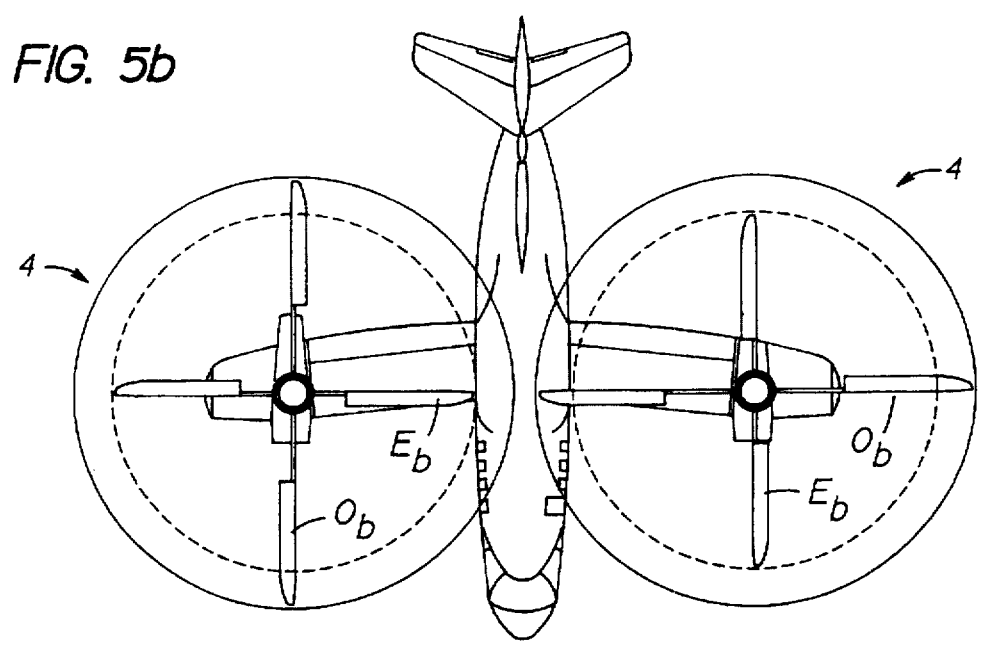
Figure 5C:
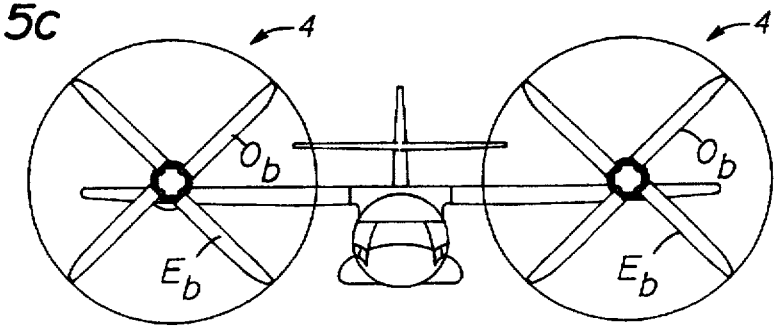

The subsequent discussion will address various positioning means for varying the length of VDR blade assemblies. The mechanisms are useful for any variety of VDR system, but are described in the context of a tilt rotor aircraft wherein all the blade assemblies may be extended, alternately varied in length, or retracted. More specifically, and referring to FIGS. 5a–5c, the blade assemblies $O_b$, $E_b$ of the VDR systems 4 are extended in a first operating mode corresponding to hover or low speed flight operations (FIG. 5a), are alternately varied in blade length in a second operating mode corresponding to descending flight operations (FIG. 5b), and are retracted in a third operating mode corresponding to high speed cruise flight operations (FIG. 5c).

BALLSCREW ARRANGEMENT FOR VARYING BLADE LENGTH

Inasmuch as the telescoping features and blade positioning means are similar for all blade assemblies $O_b$, $E_b$, it will facilitate the discussion to describe one of the blade assemblies, e.g., the odd blade assembly $O_b$, with the objective of describing those features which are common to both odd and even blade assembles $O_b$, $E_b$. Subsequently, the discussion will distinguish between the odd and even rotor blade assemblies $O_b$ and $E_b$, to identify structural and functional differences therebetween which facilitate control of rotor blade length.

In FIG. 6a, the odd blade assembly O_b is broken away to reveal the internal arrangement for varying blade length. The outboard blade section 12 telescopically mounts to the inboard blade section 10 (hereinafter referred to as a torque tube member). More specifically, the outboard blade section 12 includes a spar member 34 which is enveloped by a leading edge sheath 36 (FIG. 6b) and a foam-filled trailing edge pocket assembly 38 to define the requisite aerodynamic contour of the outboard blade section 12. The spar member 34 is coaxially aligned with and accepts the torque tube member 10 so as to permit telescopic translation thereof relative to the torque tube member 10.

Coaxial alignment of the torque tube and spar members 10, 34 may be effected by any conventional bearing assembly such as a rolling element bearing assembly, however, in the described embodiment, the bearing assembly includes a first bearing block 40a mounted to the outboard end of the torque tube member 10 and a second bearing block 40b mounted to the inboard end of the spar member 34, and preferably internally thereto. The first bearing block 40a slideably engages an internal pilot surface 42 formed within the spar member 34 and the second bearing block 40b slideably engages an external pilot surface 44 formed about the exterior of the torque tube member 10.

In FIG. 6c, the root end of the torque tube member 10 is adapted for mounting to a cuff assembly 50 which is journally mounted to a radial arm 52 of the rotor hub assembly 6. The cuff assembly 50 engages a flared root end portion 54 of the torque tube member 10 by means of a correspondingly shaped internal restraint member 56 and an external restraint sleeve 58. The cuff assembly 50, furthermore, includes a pitch control arm 60 through which pitch control inputs are made about the feathering axis 62 of the blade assembly $O_b$.

Figure 7:
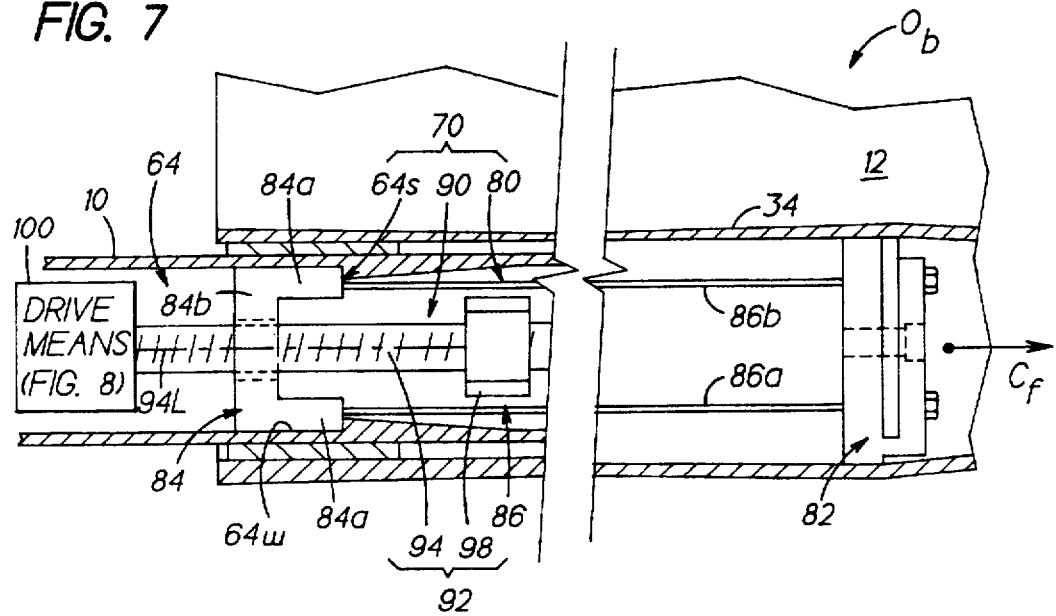
FIG. 7 depicts an enlarged view of the relevant portions of the positioning means including: a centrifugal restraint assembly disposed in combination with the outboard blade section and in combination with an internal stop surface, and an actuation means including a drive means and a ballscrew assembly operative for engaging and disengaging the centrifugal restraint assembly.

In FIG. 7, the torque tube and spar members 10, 34 define an internal chamber 64 for accepting a blade positioning means 70. The positioning means 70 is operative to position the outboard blade section 12 relative to the torque tube member 10 and, consequently, vary the radial length of the blade assembly $O_b$. The positioning means 70 includes: a centrifugal restraint assembly 80, a stop surface 64s formed internally of the chamber 64, and an actuation means 90 operative for engaging and disengaging the centrifugal restraint assembly 80.

The centrifugal restraint assembly 80 includes a retention block 82, a cradle member 84 and a connecting means 86 disposed between and mechanically coupling the retention block 82 to the cradle member 84. The retention block 82 is disposed in combination with the outboard blade section 12 and is operative, in combination with the connecting means 86, for transferring centrifugal loads Cf acting on the outboard blade section 12 to the cradle member 84. A retention block of the type described is fully disclosed in co-pending, commonly owned U.S. patent application Ser. No. 08/412, 035 (therein referred to as a "restraint assembly"). Preferably, the connecting means 86 for coupling the retention block 82 to the cradle member 84 includes fore and aft cable members 86a and 86b, respectively, which are compliant for accommodating various motions of the rotor blade assembly $O_b$.

The cradle member 84 is a generally U-Shaped member having radially extending arms 84a and a base portion 84b for structurally interconnecting the inboard ends of the radial arms 84a. The radial arms 84a are mechanically coupled to the connecting means 86 and are disposed in sliding combination with an internal wall 64w of the chamber 64 for permitting radial translation of the cradle member 84 therein.

The actuation means 90 includes a ballscrew assembly 92 disposed within the internal chamber 64, and a drive means 100 disposed internally of the rotor hub assembly 6. More specifically, the ballscrew assembly 92 includes a threaded ballscrew 94 which extends through an aperture 84h (FIG. 6b) formed in the base portion 84b of the cradle member 84 and is operative for rotation in a clockwise or counterclockwise direction about its longitudinal axis 94L. The ballscrew 94 is supported at an inboard end by a first journal bearing 96a (FIG. 6c) and, at an outboard end, to a second journal bearing 96b (FIG. 6a) disposed in combination with the outboard end of the torque tube member 10. The actuation means 90 further includes a ball nut 98 which is disposed in combination with the threads of the ballscrew 94, and positioned radially outboard of the cradle member 84. Furthermore, the ball nut 98 is operative, in response to rotation of the ballscrew 94, to translate axially along the longitudinal axis 94L thereof. Rotational restraint of the ball nut 98 is provided by the internal geometry of the torque tube member 10 (FIG. 6d). Ballscrew assemblies of the type described are available from Thomson Saginaw, located in Saginaw, Mich.

Figure 8:
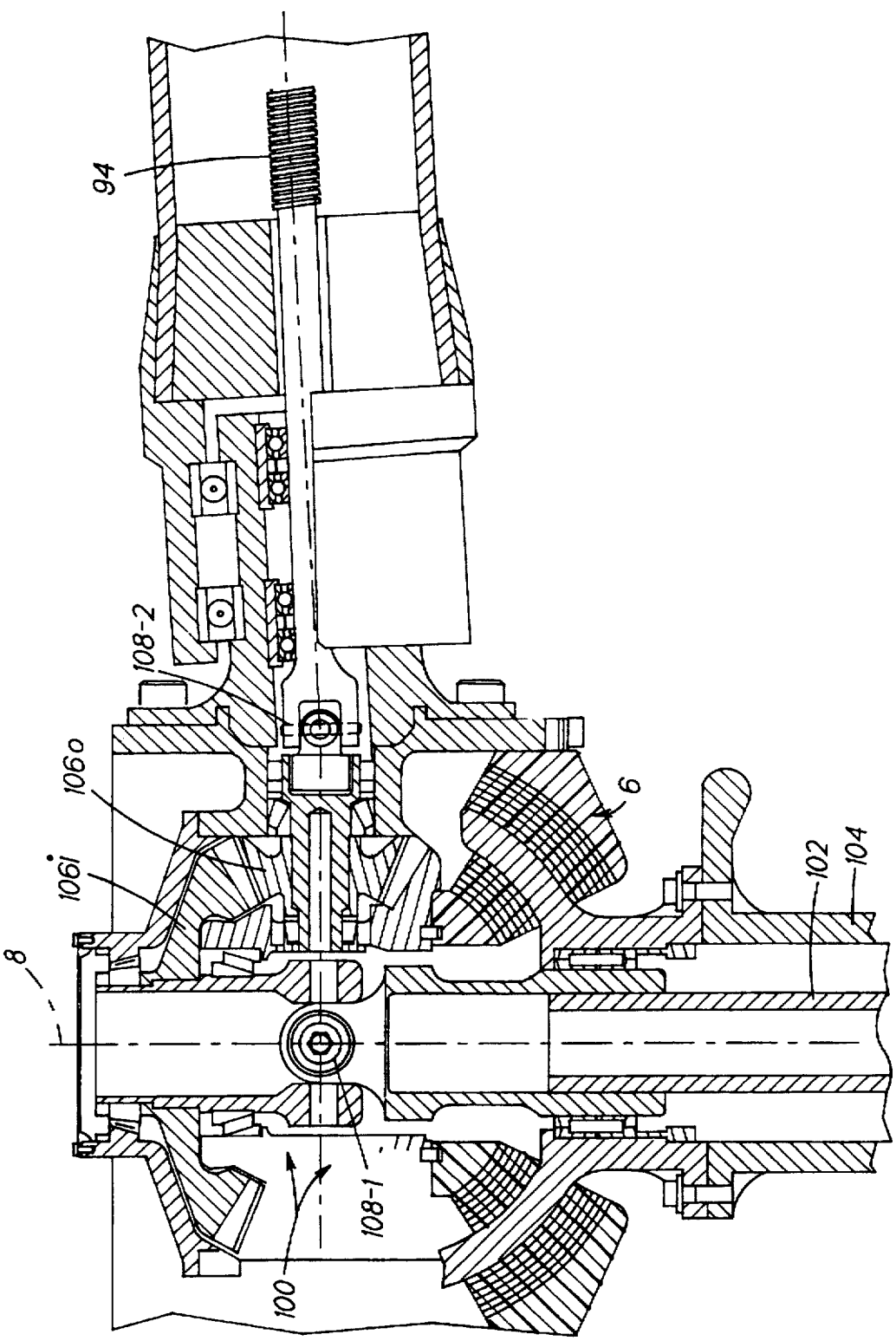
FIG. 8 is a partially broken-away side view of the drive means for effecting rotation of the ballscrew assembly.

The drive means 100 effects rotation of the ballscrew 94 and, consequently, axial displacement of the ball nut 98. In FIG. 8, the drive means 100 includes an input shaft 102 disposed internally of and coaxial with the main rotor shaft 104 which supports and drives the rotor assembly 6 about its rotational axis 8. The input shaft 102 drives an input bevel gear 106i through a first universal joint 108-1 which accommodates gimbal tilt motion of the rotor hub assembly 6. The input bevel gear 106i drives an output bevel gear 106o, one per blade assembly, which is coupled, via a second universal joint 108-2 to the ballscrew 94. The ballscrew 94 may be driven in either direction or, alternatively, rotationally fixed by controlling the rotational speed of the input shaft 102 relative to the main rotor shaft 104. For example, by driving the input shaft 102 and, consequently, the input bevel gear 106i, at a higher rotation speed than the main rotor shaft, the output bevel gear 106o, which is rotating with the main rotor shaft 104, will be driven in the direction of the speed differential. If the input drive shaft 102 rotates at the same operational speed as the main rotor shaft 104, no differential rotation is effected between the input and output bevel gears 106i, 106o, hence the ballscrew 94 will remain rotationally fixed. Drive means which are structurally and functionally similar to that described above are discussed in U.S. Pat. Nos. 4,142,697, 4,009,997, 3,884,594 and 3,713,751.

Figure 9:
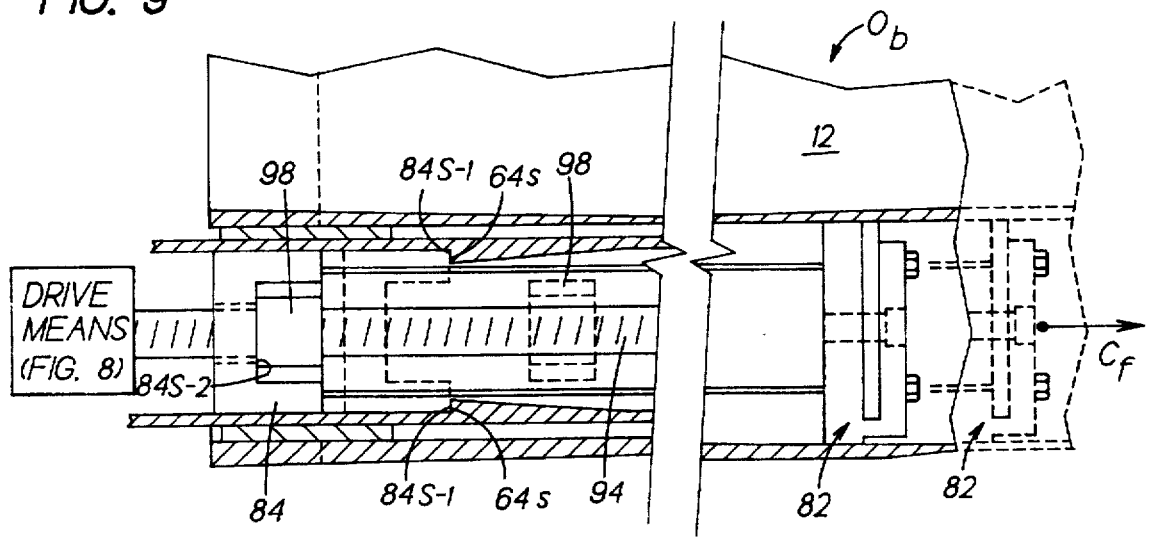
FIG. 9. depicts the positioning means in two operating positions wherein a ball nut element of the ballscrew assembly is disengaged from the centrifugal restraint assembly in one operating mode such that the centrifugal restraint assembly engages the stop surface and wherein the ball nut is engaged with the centrifugal restraint assembly in another operating mode.

In FIG. 9, the cradle member 84 is outwardly biased by centrifugal forces Cf acting on the outboard blade section 12 such that the cradle member 84 is disposed in abutting engagement with the ball nut 98 or the stop surface 64s to determine the radial length of the rotor blade assembly $O_b$. In one of the operating modes, the cradle member 84 engages the stop surface 64s vis-a-vis a first bearing surface 84s-1 thereof such that the rotor blade assembly $O_b$ is fully-extended, i.e., at its maximum permissible length. Centrifugal loads Cf acting on the outboard blade section are transferred to the cradle member 84 and reacted by the stop surface 64s. In another operating mode, the ball nut 98 is transpositioned, in response to rotation of the ballscrew 94, so as to engage the cradle member 84 vis-a-vis a second bearing surface 84s-2 thereof. In this operating mode, the cradle member 84 follows the ball nut 98 provided, however, that the first bearing surface 84s-1 is disengaged from the stop surface 64s. Furthermore, centrifugal loads acting on the outboard blade section 12 are transferred to the actuation means 90 via the cradle member 84. The outboard blade section 12 is thereby caused to telescope inwardly or outwardly depending upon the directional displacement of the ball nut 98.

The foregoing discussion has described the structural elements which are common to all blade assemblies $O_b$, $E_b$ of the VDR system 4. The following discussion addresses the structural or functional differences between odd and even blade assemblies $O_b$, $E_b$ which produce the desired blade length variations. A subscript "O" or "E" will be used to distinguish between odd to even blade assemblies, $O_b$ to $E_b$.

Figure 10A:
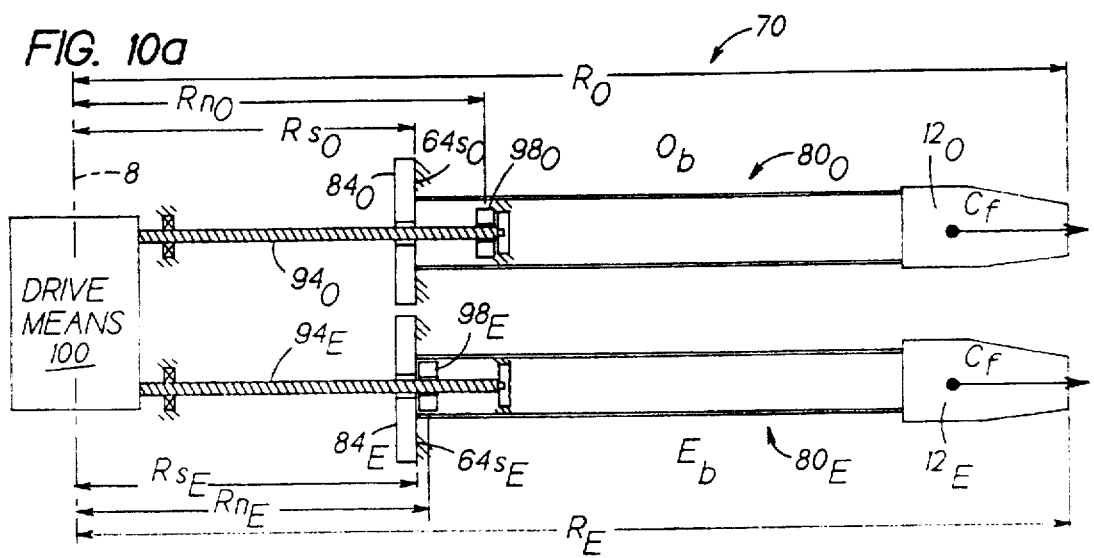
FIGS. 10a–10c schematically depict one embodiment of the positioning means in first, second and third operating modes wherein ballscrew assemblies are employed for effecting telescopic translation of the odd and even blade assemblies and wherein the relative position of the ball nuts effects the desired blade length variation.
Figure 10B:
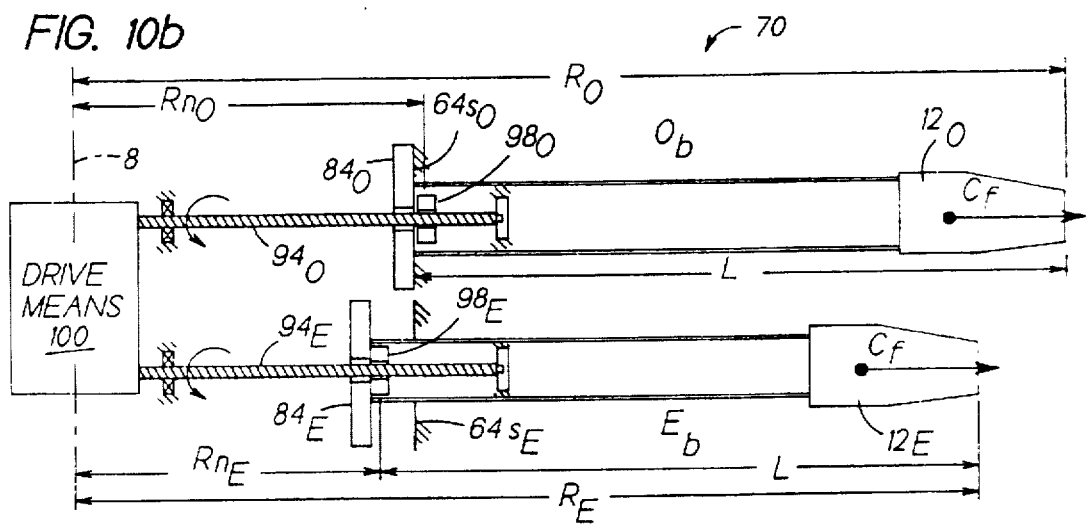
Figure 10C:
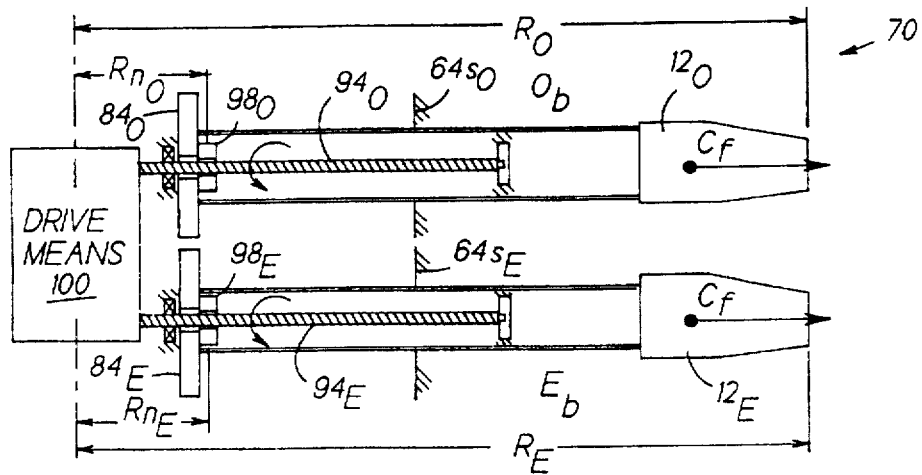

In FIGS. 10a–10c, one embodiment of the present invention is shown wherein the positioning means 70 for controlling blade length is schematically depicted. Each schematic depicts the first, second, and third operating modes corresponding to FIGS. 5a, 5b and 5c, respectively. Representative odd and even blade assemblies $O_b$, $E_b$ are arranged in side-by-side relation for ease of comparison. Moreover, the external structures which envelop the positioning means 70, e.g., the spar member 34, torque tube member 10, rotor hub assembly 6 etc., have been removed to facilitate the discussion.

While many elements of the positioning means 70 have been previously described in the context of the odd blade assembly $O_b$, it should be understood that the positioning means 70 controls the blade length of all blade assemblies, i.e., odd and even blade assemblies $O_b$, $E_b$. In FIG. 10a, the ballscrews $94_O$, $94_E$ are supported between the first and second bearing assemblies and extend through the respective cradle members $84_O$, $84_E$ such that the ball nuts $98_O$, $98_E$ are disposed radially outboard thereof. Furthermore, the ball nuts $98_O$ and $98_E$ are positioned along the respective ballscrews $94_O$ and $94_E$ so as to define radial distances $Rn_O$ and $Rn_E$, respectively, measured from the rotational axis 8 of the rotor hub assembly. Initially, the relative position of the ball nuts $98_O$, $98_E$ is prescribed such that the ball nut $98_E$ of the even blade assembly $E_b$ is radially inboard of the ball nut $98_O$ of the odd blade assembly $O_b$. The functional significance of such relative position will become apparent in the subsequent views.

In the first operating mode, the ballnuts $98_O$, $98_E$ are disengaged from the cradle members $84_O$, $84_E$ such that the cradle members $84_O$, $84_E$, in response to centrifugal loads $C_f$, are disposed in abutting engagement with the stop surfaces $64s_O$, $64s_E$. Insofar as the length of the centrifugal restraint assemblies $80_O$, $80_E$ is preferably constant i.e., from odd to even blade assemblies $O_b$, $E_b$, the radial distances $Rs_O$, $Rs_E$ defined by the stop surfaces $64s_O$, $64s_E$ determine the maximum permissible length $R_O$, $R_E$ of the odd and even rotor blade assemblies $O_b$, $E_b$. In the described embodiment, the radial distance $Rs_O$ of the odd blade assembly $O_b$ is equal to the radial distance $Rs_E$ of the even blade assembly $E_b$, such that blade assemblies $O_b$, $E_b$ are fully-extended and equal in radial length. Such blade assembly configuration provides maximum rotor disk area for optimum aerodynamic performance.

In the second operating mode (FIG. 10b), the ball nuts $98_O$ and $98_E$ are transpositioned inwardly to an intermediate position in response to rotation of the respective ballscrews $94_O$, $94_E$ by the drive means 100. Inasmuch as the ball nut $98_E$ is disposed radially inboard of the ball nut $98_O$, the ball nut $98_E$ engages the respective cradle member $84_E$ thereby effecting inward telescopic translation of the outboard blade section $12_E$. The ball nut $98_O$ of the odd blade assembly $O_b$ also translates inwardly, but does not engage the respective cradle member $84_O$. When disposed in their respective intermediate positions, the ball nut $98_E$ is disposed in abutting engagement with the respective cradle member $84_E$ and the ball nut $98_O$ is disengaged from the respective cradle member $84_O$. Consequently, the cradle member $84_O$ remains in abutting engagement with the stop surface $64s_O$.

In view of the foregoing, it will be appreciated that the radial distances $Rn_O$, $Rn_E$ defined by the ball nuts $98_O$, $98_E$ determines the maximum permissible variation in blade assembly length $R_O$, $R_E$. That is, by suitably positioning the ball nuts $98_O$, $98_E$ along the respective ballscrews $94_O$, $94_E$, the length $R_E$ of the even blade assembly $E_b$ may be altered without influencing the radial length $R_O$ of the odd blade assembly $O_b$. More specifically, the ball nuts $98_O$, $98_E$ are positioned such that radial distance $Rn_E$ of ball nut $98_E$ is between about $0.7Rn_O$–$0.3L$ to about $0.95Rn_O$–$0.05L$ and, preferably, between about $0.83Rn_O$–$0.17L$ to about $0.92Rn_O$–$0.08L$, wherein L is the length from one of the cradle members $84_O$, $84_E$ to the tip end of the one of the outboard blade section $12_O$, $12_E$. This is also based on the assumption that the lengths L from odd to even blade assemblies $O_b$, $E_b$ are equal. Consequently, the odd and even blade assemblies $O_b$, $E_b$, may be varied in length by an amount proportional to the radial spacing of the ball nuts $98_O$, $98_E$. This blade assembly configuration is effected in a descending flight mode for optimum acoustic performance, i.e., BVI noise reduction.

In the third operating mode (FIG. 10c), the ball nuts $98_O$ and $98_E$, and consequently, the cradle members $84_O$, $84_E$, are transpositioned inwardly to a fully-inboard position. During the transition, the ball nut $98_O$ of the odd blade assembly $O_b$ engages the respective cradle member $84_O$ and translates inwardly at an increased linear rate relative to the ball nut $98_E$. The linear rate differential causes the ball nuts $98_O$ and $98_E$ to reach their respective inboard positions at the same time, i.e., such that the radial distance $Rn_E$ equals the radial distance $Rn_O$. Such rate differential may be effected by varying the thread pitch of the ballscrews $94_O$, $94_E$, varying the rotational speed of the ballscrews $94_O$, $94_E$, or a combination thereof. With regard to the former, a thread pitch differential may be effected by increasing the thread pitch of the ballscrews $94_O$ with respect to the thread pitch of the ballscrews $94_E$. The pitch differential causes the ball nuts $98_O$, $98_E$ to traverse at different linear rates such that at an inboard radial position, the radial distances $Rn_O$, $Rn_E$ of the ball nuts $98_O$, $98_E$ are equal. With regard to the latter, a speed differential may be effected by altering the gear ratios of the input and output bevel gears 106i, $106o_O$, $106o_E$ such that the rotational speed of ballscrew $94_O$ is greater than the rotational speed of ballscrew $94_E$.

When in their respective inboard positions, the ball nuts $98_O$, $98_E$ are disposed in abutting engagement with the cradle members $84_O$, $84_E$ and the blade assemblies $O_b$, $E_b$ are fully-retracted. Such blade assembly configuration corresponds to high speed cruise flight operations wherein the rotor disk is vertically oriented for maximum propulsive efficiency.

Figure 11A:
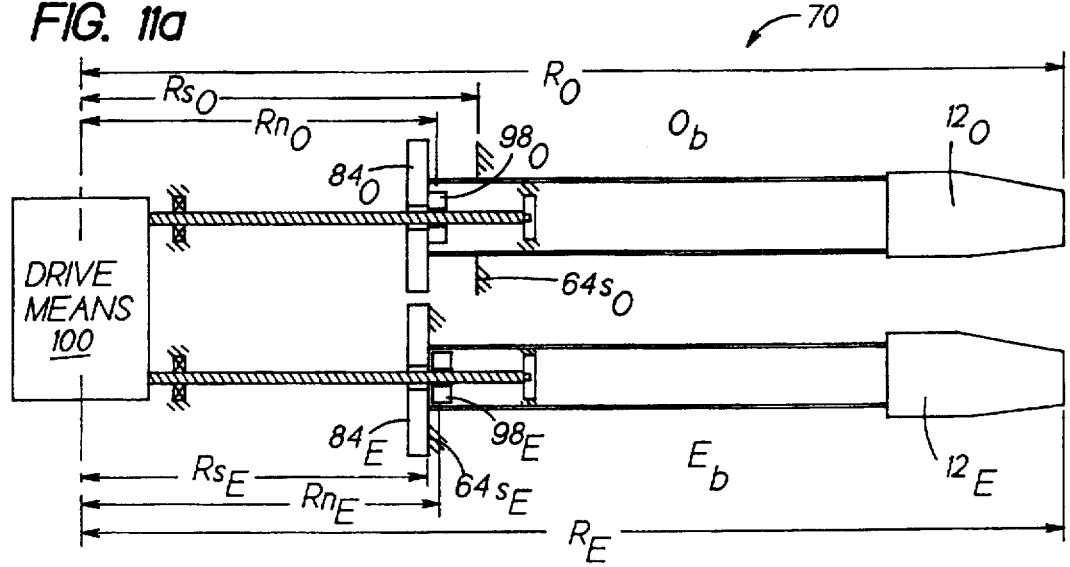
FIGS. 11a–11c schematically depict another embodiment of the positioning means in the first, second and third operating mode wherein ballscrew assemblies are employed for effecting telescopic translation of the odd and even blade assemblies and wherein the relative position of the stop surfaces effects the desired blade length variation.
Figure 11B:
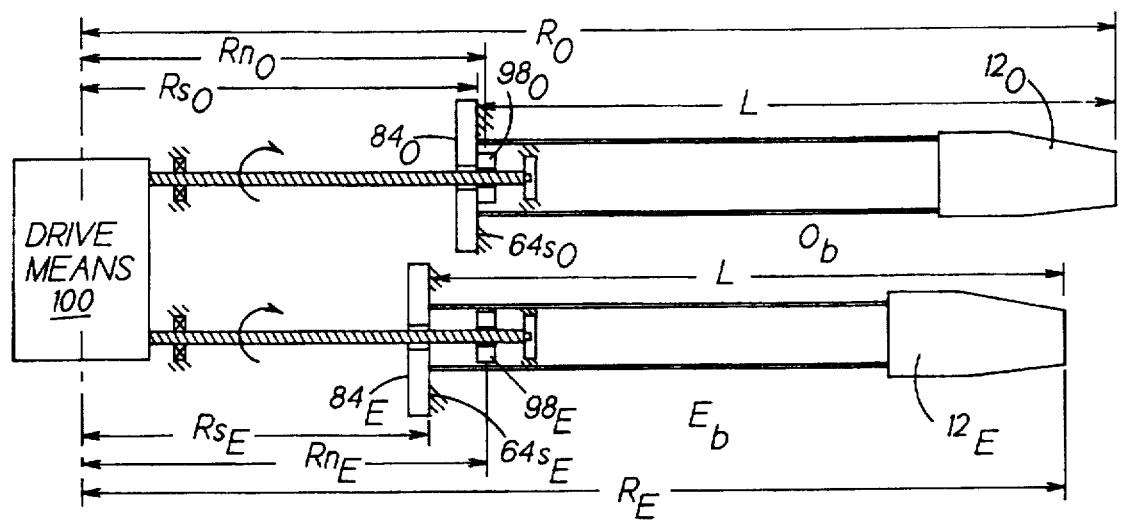
Figure 11C:
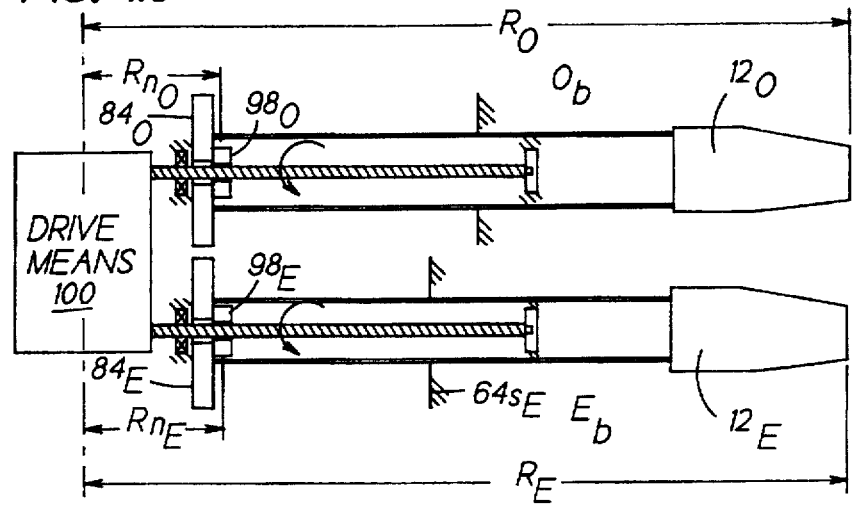

Another embodiment of the positioning means 70 is shown in FIGS. 11a–11c wherein the same operating modes are depicted as those illustrated and described in FIGS. 10a–10c. In this embodiment of the invention, the radial distances $Rn_O$, $Rn_E$ defined by the ball nuts $98_O$, $98_E$ are equal, and the radial distances $Rs_O$, $Rs_E$ defined by the stop surfaces $64s_O$, $64s_E$ determine the percentage variation in blade length $R_O$, $R_E$. In the first operating mode, (FIG. 11a) ballnut $98_O$ of the odd blade assembly $0_b$ is disposed in abutting engagement with the cradle member $84_O$ and the ball nut $98_E$ of the even blade assembly $E_b$ is disengaged from the cradle member $84_E$ thus causing the cradle member $84_E$ to be disposed in abutting engagement with the stop surface $64s_E$. The radial distances $Rn_O$ and $Rs_E$ defined by the ball nut $84_O$ and the stop surface $64s_E$, respectively, are substantially equal such that the odd and even blade assemblies $O_b$, $E_b$, are extended, and the radial length $R_O$ of the even blade assembly $O_b$ is equal to the radial length $R_E$ of the even blade assemblies $E_b$. These radial distances $Rn_O$, $Rs_E$ may vary depending upon the configuration of the cradle member $84_O$, $84_E$.

In the second operating mode, (FIG. 11b) the ball nuts $98_O$, $98_E$ are transpositioned to an outboard position such that the cradle member $84_O$ of the odd blade assembly $O_b$ also engages the respective stop surface $64s_O$. Consequently, the odd blade assembly $O_b$ will translate radially outboard to its fully-extended position while the even blade assembly $E_b$ remains fixed due to the axial restraint provided by the stop surface $64s_E$. In this embodiment of the invention, the maximum permissible variation in blade assembly length $R_O$ and $R_E$ is effected by varying the radial distances $Rs_O$, $Rs_E$ of the stop surfaces $64s_O$, $64s_E$. More specifically, the stop surfaces $64s_O$, $64s_E$ are positioned such that the radial distance $Rs_E$ is between about $0.7Rs_O$–$0.3L$ to about $0.95Rs_O$–$0.05L$ and, preferably, between about $0.83Rs_O$–$0.17L$ to about $0.92Rs_O$–$0.08L$, wherein L is the length from one of the cradle members $84_O$, $84_E$ to the tip end of the one of the outboard blade section $12_O$, $12_E$. Again, it is assumed that the length L is equal from odd to even blade assemblies $O_b$, $E_b$. Consequently, the odd and even blade assemblies $O_b$, $E_b$ may be varied in length by an amount proportional to the radial spacing of the stop surfaces $64s_O$, $64s_E$.

In the third operating mode (FIG. 11c), the ball nuts $98_O$, $98E$ engage the cradle members $84_O$, $84_E$ and translate to a fully inboard position. During the transition from the second to third operating modes, the ball nut $98_O$ of the odd blade assembly $O_b$ initially engages the respective cradle member $84_O$ and, subsequently, the ball nut $98_E$ of the even blade assembly engages its respective cradle member $84_E$. With both cradle members $84_O$, $84_E$ engaged, the outboard blade sections $12_O$, $12_E$ telescope inwardly, in unison, to the desired fully-inboard position. When in their respective inboard positions, the ball nuts $98_O$, $98_E$ are disposed in abutting engagement with the cradle members $84_O$, $84_E$ and the blade assemblies $0_b$, $E_b$ are fully-retracted.

While the described embodiment employs an actuation means 70 having a ballscrew assembly 92 for effecting telescopic translation of the blade assemblies $O_b$, $E_b$, it will be appreciated that other devices such as a threaded jackscrew/nut or a threaded rollerscrew/roller nut may be substituted therefor. Furthermore, while the described embodiment employs a cradle member 84 having a generally U-shape, it will be appreciated that the configuration of the cradle member may take any form. For example, a simple cross member which conforms to the shape of the internal chamber 64 may functionally replace the U-shaped cradle member 84. While the described embodiment includes cable members 86a, 86b for connecting the retention block 82 to the cradle members 84, it will be appreciated that other means are contemplated. For example, strap or compliant tubular members which are capable of withstanding high tensile loads may be employed in lieu of the cable members 86a, 86b.

REELING ASSEMBLY FOR VARYING BLADE LENGTH

Other embodiments of the positioning means 70 are shown in FIGS. 12a–12f, 13a–13c, and 14a–14c wherein the actuation means 90 includes a reeling assembly 110 and means 120 for driving the reeling assembly 110. Again, it will facilitate the discussion to describe the positioning means 70 with respect to one blade assembly and subsequently discuss the features thereof which permit independent control of odd and even blade assemblies for varying blade length.

In FIGS. 12a–12c, the reeling assembly 110 includes a cylindrical drum 112 operative for rotation about the rotor hub assembly axis 8, an end fixity 114 disposed internally of the chamber 64 and operative for engaging and disengaging the cradle member 84, and strap means 116 for connecting the end fixity 114 to the cylindrical drum 112. More specifically, the end fixity 114 is disposed radially outboard of the cradle member 84 and disposed in sliding combination with the connecting means 86 (FIG. 12b) and/or an internal wall 64ws of the chamber. The strap means 116 is mechanically coupled to the end fixity 114 and extends through the aperture 84h of the cradle member 84 (FIG. 12c) for connecting to the cylindrical drum 112. Depending upon the rotational sense of the cylindrical drum 112, the strap means 116 is wound-up or let-out such that the end fixity 114 is operative to engage the cradle member 84 or, alternatively, disengage from the cradle member 84 such that the cradle member engages the stop surface 64s. When the end fixity 114 is engaged with the cradle member 84, centrifugal loads $C_f$ acting on the outboard blade section 12 are transferred to the cylindrical drum 112.

In FIG. 12d–12f, the cylindrical drum 112 is disposed internally of the rotor hub assembly 6 and may be driven in either direction by the drive means 120. The drive means 120 includes an overhead planetary gear system 140 which is driven by an input drive shaft 122. More specifically, the input drive shaft 122 includes: an upper stub shaft portion 122u which is supported by an upper mounting fixture 126 of the rotor hub assembly 6 via a bearing assembly 128, a lower drive shaft portion 122L coaxially aligned with the main rotor shaft 104, and a universal joint 130 disposed therebetween for accommodating gimbal tilt motion of the rotor hub assembly 6. The cylindrical drum 112 is supported for rotation about the stub shaft portion 122u via a bearing assembly 132, thereby permitting the drum 112 to synchronously tilt with the rotor hub assembly 6.

The planetary gear system 140 includes: a driving sun gear 142 coaxially aligned with the rotor hub assembly axis 8, a ring gear 144 rigidly affixed to the mounting fixture 126 of the rotor hub assembly 6, and a plurality of planetary pinions 146 disposed between and interacting with the sun and ring gears 142, 144. The sun gear 142 is spline connected to and driven by the stub shaft portion 122u of the input drive shaft 122 and drives the planetary pinions 146 about the rotor hub assembly axis 8. More specifically, the planetary pinions 146 traverse in an epicycle about the sun gear 142 at reduced rotational speed relative thereto due to interaction of the planetary pinion 146 with the ring gear 144. The output of the planetary pinions 146 is transferred to the cylindrical drum 112 by means of carrier posts 148 which are disposed in combination with each planetary pinion 146 and the upper surface 150 of the cylindrical drum 112.

It will be appreciated that the sum of the centrifugal loads $C_f$ acting on the outboard blade sections 12 is reacted in torsion by the input drive shaft 122. By interposing the planetary gear system 140 in the load path, i.e., from the outboard blade section 12 to the input drive shaft 122, the torsional load imposed on the input drive shaft 122 is substantially reduced. That is, the planetary gear system 140, provides a mechanical advantage which substantially reduces the tangential loading on the sun gear 142, and, accordingly, the torsional loads on the input drive shaft 122. Consequently, the requisite size and/or thickness of the input drive shaft 122 may be reduced. In the described embodiment, the pitch diameter ratio Rs/Rp between the sun and planetary gears 142, 146 is about 0.75 and the face width, i.e., the height dimension, of the meshing teeth is about 7.5 in (19 cm). This combination of parameters reduces the torsional loading in the input drive shaft 122 by a factor of 4.

Figure 13A:
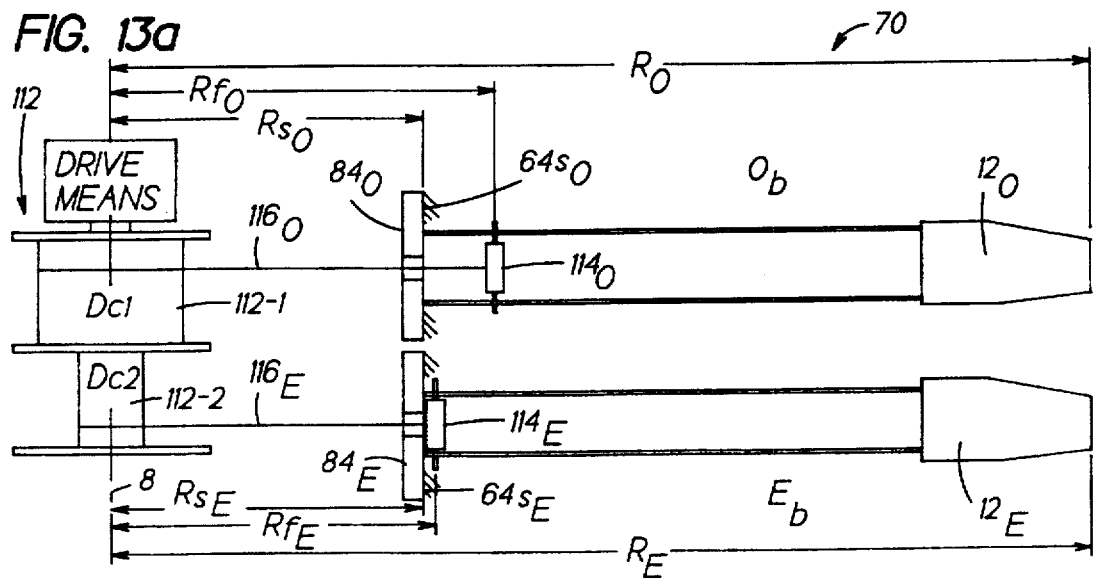
FIGS. 13a–13c schematically depict another embodiment of the positioning means in first, second and third operating modes wherein the reeling assembly is employed for effecting telescopic translation of the odd and even blade assemblies and wherein the relative position of the end fixities effects the desired blade length variation.
Figure 13B:
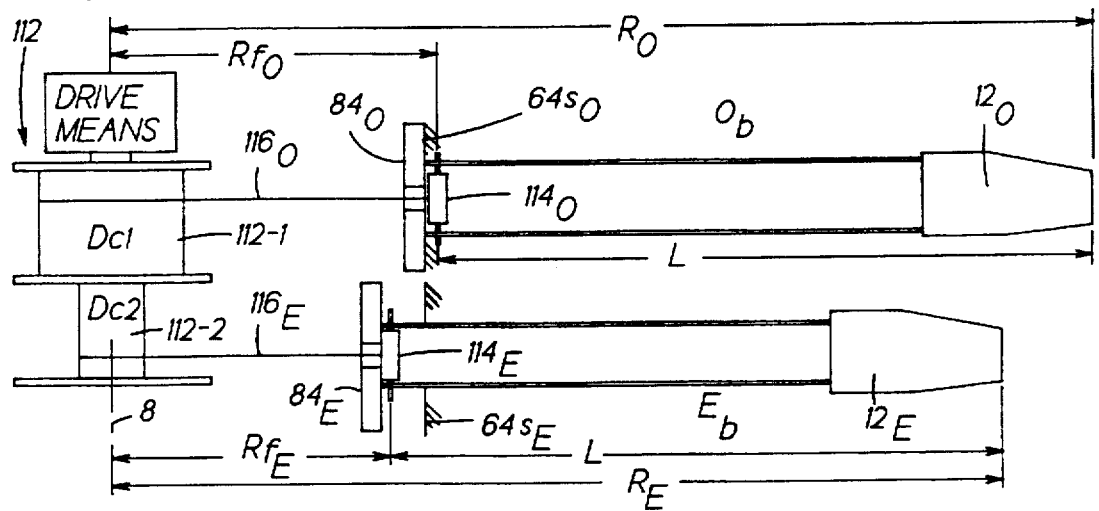
Figure 13C:
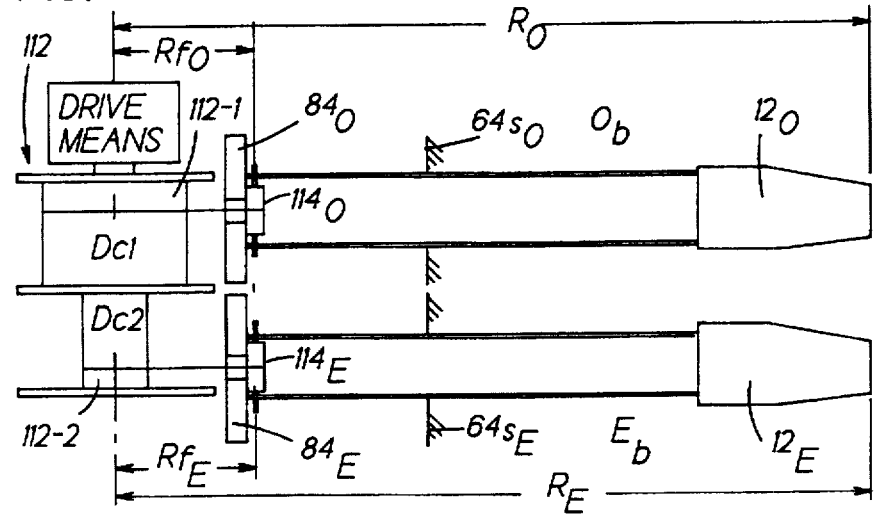

In FIGS. 13a–13c, an embodiment of the positioning means 70/reeling assembly 110 is schematically depicted, which embodiment is operationally similar to FIGS. 10a–10c. Similar to the earlier described embodiments, a subscript "O" and "E" will be used to differentiate between odd and even blade assemblies $O_b$, $E_b$.

In FIG. 13a, the cylindrical drum 112 of the reeling assembly 110 includes first and second cylindrical surfaces 112-1 and 112-2, respectively, which are disposed in biplanar relation. The first and second cylindrical surfaces 112-1 and 112-2 define diameter dimensions Dc1 and Dc2, respectively, wherein the diameter Dc1 of the first cylinder 112-1 is greater than the diameter Dc2 of the second cylinder 112-2. Furthermore, the strap means $116_O$ and $116_E$ of the odd and even blade assemblies $O_b$ and Eb, respectively, are disposed in winding combination with the first and second cylinders 112-1 and 112-2, respectively. The length of the strap means $116_O$, $116_E$, is prescribed such that the end fixities $114_O$, and $114_E$ define radial distances $Rf_O$, and $Rf_E$, respectively, from the rotational axis 8 of the rotor hub assembly. Initially, the radial distance $Rf_O$ is greater than radial distance $Rf_E$.

In the first operating mode, the end fixities $114_O$, $114_E$ are disengaged from the cradle members $84_O$, $84_E$, such that the cradle members $84_O$, $84_E$ are disposed in abutting engagement with the stop surfaces $64s_O$, $64s_E$. In the described embodiment, the radial distances $Rs_O$, $Rs_E$ defined by the stop surfaces $64s_O$, $64s_E$ are equal, hence the blade assemblies $O_b$, $E_b$ are equal in radial length and are fully extended.

In the second operating mode (FIG. 13b), the end fixities $114_O$, $114_E$ are transpositioned inwardly to an intermediate position by rotation of the cylindrical drum 112 and wind-up of the respectively strap means $116_O$, $116_E$. During the transition, the end fixity $114_E$ of the even blade assembly $E_b$ engages the respective cradle member $84_E$ thereby effecting inward telescopic translation of the outboard blade section $12_E$. The end fixity $114_O$ of the outboard blade section $O_b$ also translates inwardly, but does not engage the respective cradle member $84_O$. When disposed in their respective intermediate positions, the end fixity $114_E$ is disposed in abutting engagement with the respective cradle member $84_E$ and the end fixity $114_O$ is disengaged from the respective the cradle member $84_O$ such that the cradle member $84_O$ remains in abutting engagement with the stop surface $64s_O$. Furthermore, the end fixities $114_O$, $114_E$ are positioned such that the radial distance $Rf_E$ of the end fixity $114_E$ is between about $7Rf_O$–$0.3L$ to about $0.95Rf_O$–$0.05L$ and, preferably, between about $0.83Rf_O$–$0.17L$ to about $0.92Rf_O$–$0.08L$, wherein L is the length from one of the cradle members $84_O$, $84_E$ to the tip end of the one of the outboard blade section $12_O$, $12_E$. Such relative position of the end fixities $114_O$, $114_E$ effects the maximum permissible variation in blade length $R_O$, $R_E$.

In the third operating mode, (FIG. 13c), the end fixities $114_O$, $114_E$ engage the cradle members $84_O$, $84_E$ and are transpositioned inwardly to a fully inboard position. Insofar as the diameter Dc1 of the first cylindrical surface 112-1 is greater than the diameter Dc2 of the second cylindrical surface, the end fixity $114_O$ of the odd blade assembly $O_b$ will translate inwardly at an increased linear rate relative to the end fixity $114_E$. The linear rate differential causes the end fixities $114_O$, $114_E$ to reach their respective inboard positions at the same instant in time, i.e., such that the radial distance $Rf_O$ is equal to the radial distance $Rf_E$.

Figure 14A:
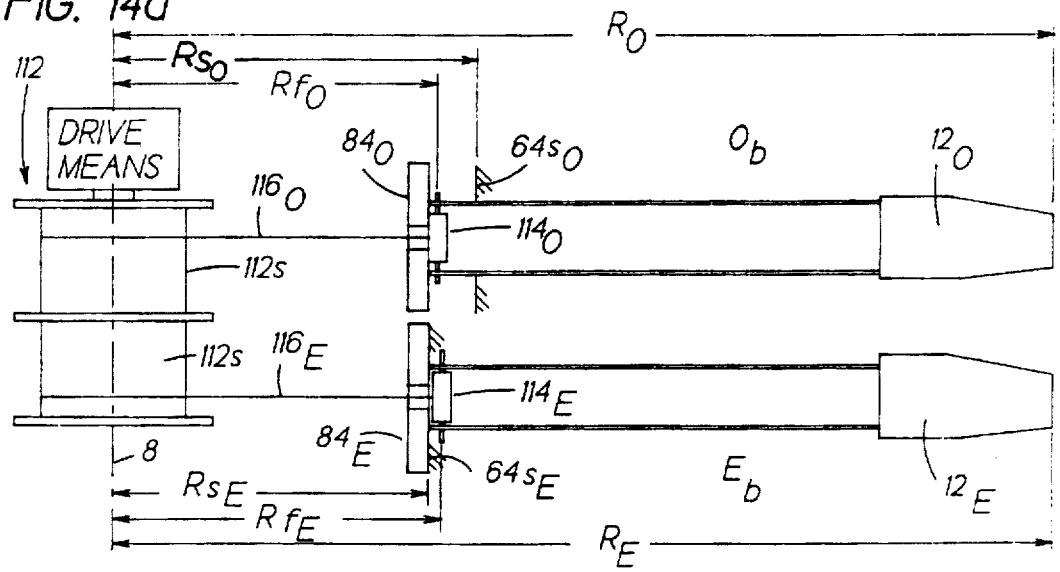
FIGS. 14a–14c schematically depict yet another embodiment of the positioning means in the first, second and third operating mode wherein the reeling assembly is employed for effecting telescopic translation of the odd and even blade assemblies and wherein the relative position of the stop surfaces effects the desired blade length variation.
Figure 14B:
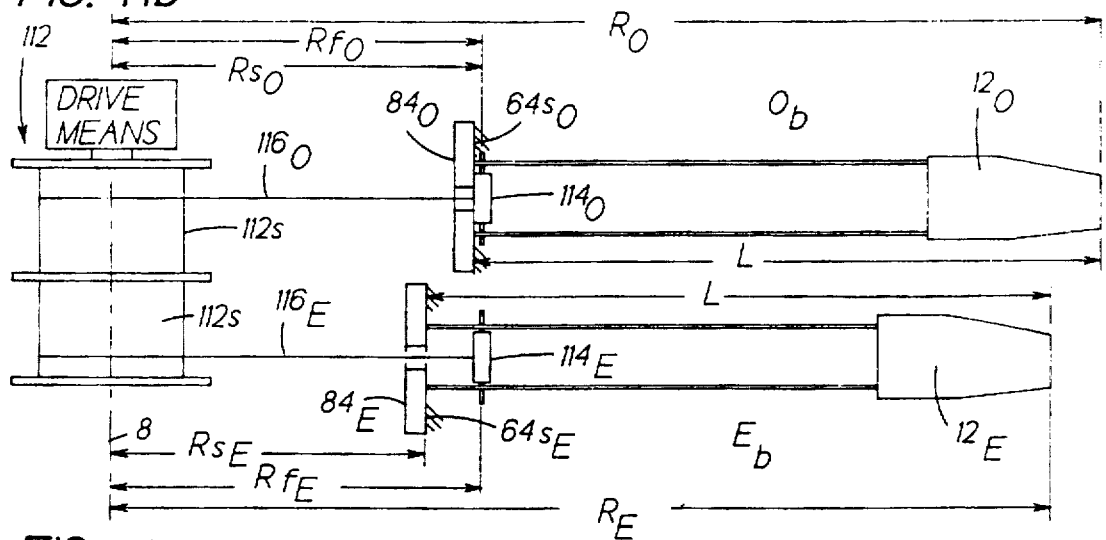
Figure 14C:
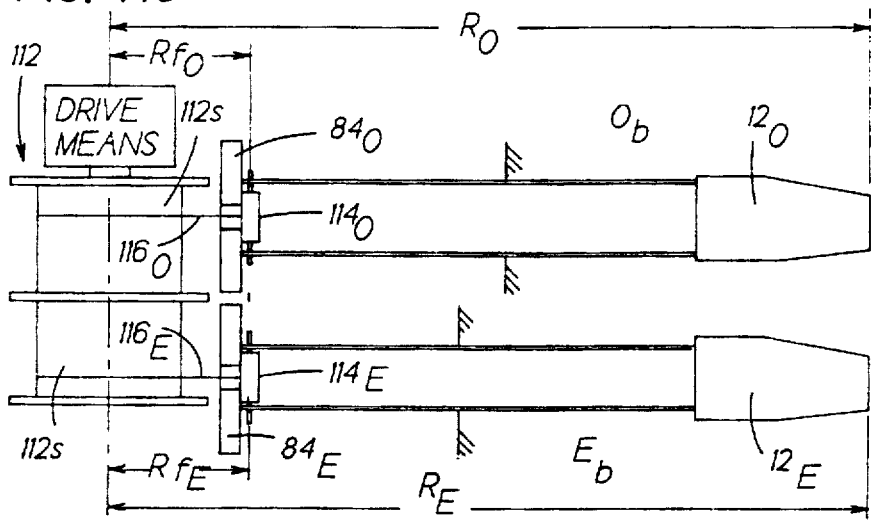

In FIGS. 14a–14c, another embodiment of the positioning means 70/reeling assembly 110 is schematically depicted, which embodiment is operationally similar to FIGS. 11a–11c. In FIG. 14a, the cylindrical drum 112 defines a cylindrical surface 112s upon which the strap means $116_O$, $116_E$ may be wound on or off. The strap means $116_O$, $116_E$ are of equal length, and, consequently, the end fixities $114_O$, $114_E$ are equidistant from the rotational axis 8. Furthermore, the stop surfaces $64s_O$ and $64s_E$ define radial distances $Rs_O$ and $Rs_E$, respectively, wherein the radial distance $Rs_E$ is between about $0.7Rs_O$–$0.3L$ to about $0.95Rs_O$–$0.05L$, and, preferably, between about $0.83Rs_O$–$0.17L$ to about $0.95Rs_O$–$0.08L$ wherein L is the length from one of the cradle members $84_O$, $84_E$ to the tip end of the one of the outboard blade section $12_O$, $12_E$.

In the first operating mode, the end fixity $114_O$ of the odd blade assembly $O_b$ is disposed in abutting engagement with the cradle member $84_O$ and the end fixity $114_E$ of the even blade assembly $E_b$ is disengaged from the cradle member $84_E$. Consequently, the cradle member $84_E$ is disposed in abutting engagement with the stop surfaces $64s$. The radial distances $Rf_O$ and $Rs_E$ defined by the end fixity $114_O$ and the stop surface $64s_E$, respectively, are substantially equal such that the odd and even blade assemblies $O_b$, $E_b$ are extended, and the radial length $R_O$ of the even blade assembly $O_b$ is equal to the radial length $R_E$ of the even blade assemblies $E_b$.

In the second mode, (FIG. 14b), the end fixities $114_O$, $114_E$ are transpositioned to an outboard position, in response to rotation of the cylindrical drum 112, such that the cradle member $84_O$ of the odd blade assembly $O_b$ also engages the respective stop surface $64s_O$. Consequently, the odd blade assembly $O_b$ will translate to its fully extended position while the even blade assembly $E_b$ remains fixed due to the axial restraint provided by the stop surface $64s_E$. In this embodiment of the invention, maximum permissible variations in blade assembly length $R_O$ and $R_E$ may be effected by varying the radial distances $Rs_O$, $Rs_E$ of the stop surfaces $64s_O$ and $64s_E$, respectively.

In FIG. 14c, the end fixities $114_O$, $114_E$ engage the cradle members $84_O$, $84_E$ and translate to a fully inboard position. Insofar as the end fixities $114_O$, $114_E$ are equidistant from the rotational axis 8, the end fixity $114_O$ of the odd blade assembly $O_b$ initially engages the respective cradle member $84_O$ and, subsequently, the end fixity $114_E$ of the even blade assembly engages its respective cradle member $84_E$. With both cradle members $84_O$, $84_E$ engaged, the outboard blade sections $12_O$, $12_E$ telescope inwardly, synchronously, to the desired inboard position. When in their respective inboard positions, the end fixities $114_O$, $144_E$ are disposed in abutting engagement with the cradle members $84_O$, $84_E$ and the blade assemblies $O_b$, $E_b$ are fully retracted.

The various embodiments of the positioning means 70 have minimal impact on the weight and/or mechanical complexity of the telescoping blade assemblies $O_b$, $E_b$. That is, the introduction of stop surfaces $64s_O$, $64s_E$ and cradle members $84_O$, $84_E$ have negligible impact on the overall weight of the rotor blade assemblies $O_b$, $E_b$. Furthermore, relatively minor modifications are required to effect a change in the rotor system configuration, i.e., in the second operating mode. For example, with respect to the embodiments depicted in FIGS. 10a–10c and 13a–13c, the initial radial position of the ball nuts $98_O$, $98_E$, or the length of the strap means $116_O$, $116_E$, may be changed to modify the maximum permissible blade length variation from odd to even blade assemblies $O_b$, $E_b$. With respect to the other described embodiments, the radial distances $Rs_O$, $Rs_E$ of the stop surfaces $64s_O$, $64s_E$ may be altered to effect the same result.

Furthermore, the pilot may control blade length, so as to selectively command blade length variations which are less than the maximum permissible blade length variation. For example, with respect to the embodiments depicted in FIGS. 10a–10c and 13a–13c, the ball nuts $98_E$ or end fixities $114_E$, may be positioned relative to the stop surfaces $64s_O$ so as to effect any combination of blade length variation within the prescribed ranges. With respect to the other embodiments the ball nuts $98_O$ or end fixities $114_O$ may be similarly positioned to effect the same result.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A Variable Diameter Rotor system (4) for rotorcraft and operative to reduce Blade-Vortex Interaction (BVI) noise, said rotorcraft operating in first and second operating modes, comprising:

a rotor hub assembly (6) defining an axis of rotation (8) about which said rotor hub assembly (6) rotates;

odd and even blade assemblies ($O_b$, $E_b$) mounting to and rotating with said rotor hub assembly (6), each of said rotor blade assemblies ($O_b$, $E_b$) having inboard and outboard blade sections (10, 12) defining an internal chamber (64), said outboard blade section (12) telescopically mounted to said inboard blade section (10) and being biased outwardly of said rotational axis (8) by centrifugal forces $C_f$ acting thereupon;

said odd and even rotor blade assemblies ($O_b$, $E_b$) each defining a radial length $R_O$ and $R_E$, respectively;

means (70) for positioning said outboard blade sections (12) with respect to said inboard blade sections (10) such that, in the first operating mode, said radial length $R_E$ of said even blade assemblies ($E_b$) is equal to said radial length $R_O$ of said odd blade assemblies ($O_b$), and, in the second operating mode, said radial length $R_E$ is between about 70% to about 95% of said radial length $R_O$, said positioning means (70) including:

a centrifugal restraint assembly (80) disposed in each said internal chamber (64) and disposed in combination with said outboard blade section (12), said centrifugal restraint assembly (80) being biased outwardly of said rotational axis (8) by said centrifugal forces $C_f$ acting on said outboard blade section (12);

a stop surface (64s) formed internally of each said internal chamber (64); and actuation means (90), in combination with said centrifugal forces operative for transpositioning said centrifugal restraint assemblies (80) within said internal chambers (64) such that, in the first operating mode, said centrifugal restraint assemblies (80) of said even blade assemblies ($E_b$) are disposed in abutting engagement with said stop surfaces ($64s_E$) thereof and said centrifugal restraint assemblies (80) of said odd blade assemblies ($O_b$) are disposed in abutting engagement with said actuation means (90) and, in the second mode, said centrifugal restraint assemblies (80) are disposed in abutting engagement with said stop surfaces (64s).

2. The Variable Diameter Rotor system (4) according to claim 1 wherein each said centrifugal restraint assembly (80) includes:

a retention block (82) disposed in combination with said outboard blade section (12);

a cradle member (84) disposed in sliding combination with an internal wall (64w) of said internal chamber (64); and a connecting means (86) disposed between and mechanically coupling said retention block (82) to said cradle member (84); and said cradle members ($84_E$) of said even blade assemblies ($E_b$), in the first operating mode, being disposed in abutting engagement with said stop surfaces ($64s_E$) thereof and said cradle members ($84_O$) of said odd blade assemblies ($O_b$) being disposed in abutting engagement with said actuation means (90) and, in the second operating mode, said cradle members (84) are disposed in abutting engagement with said stop surfaces (64s).

3. The Variable Diameter Rotor system (4) according to claim 2 wherein said actuation means (90) includes:

a ballscrew assembly (92) disposed in each said internal chamber (64), each said ballscrew assembly (92) including:

a threaded ballscrew (94) defining a longitudinal axis (94L) and operative for rotation about said longitudinal axis (94L) in a clockwise and counterclockwise direction; and a ball nut (98) disposed in threaded combination with said threaded ballscrew (94) and radially outboard of said cradle member (84), said ball nut (98), furthermore, operative for translating linearly along said ballscrew (94) in response to rotation thereof and operative for engaging and disengaging said cradle member (84); and drive means for effecting rotation of said threaded ballscrews (94) thereby effecting linear translation of said ball nuts (98).

4. The Variable Diameter Rotor system (4) according to claim 3 wherein said ball nuts ($98_O$) of said odd blade assemblies ($O_b$) define a radial distance $Rn_O$ from said rotational axis (8), and said ball nuts ($98_E$) of said even blade assemblies ($E_b$) define a radial distance $Rn_E$ from said rotational axis (8), said radial distance $Rn_E$ being equal to said radial distance $Rn_O$.

5. The Variable Diameter Rotor system (4) according to claim 2 wherein said cradle member (84) and the tip end of the outboard blade section (12) define a length dimension L therebetween; and wherein said stop surfaces ($64s_E$) of said even blade assemblies ($E_b$) define a radial distance $Rs_E$ from said rotational axis (8), and said stop surfaces ($64s_O$) of said odd blade assemblies ($O_b$) define a radial distance $Rs_O$ from said rotational axis (8), said radial distance $Rs_E$ of said stop surface ($64s_E$) being between about $0.7Rs_O - 0.3L$ to about $0.95Rs_O - 0.05L$.

6. The Variable Diameter Rotor system (4) according to claim 5 wherein said radial distance $Rs_E$ of said stop surface ($64s_E$) is between about $83Rs_O - 0.17L$ to about $0.92Rs_O - 0.08L$.

7. A Variable Diameter Rotor system (4) for rotorcraft and operative to reduce Blade-Vortex Interaction (BVI) noise, said rotorcraft operating in first and second operating modes, comprising:

a rotor hub assembly (6) defining an axis of rotation (8) about which said rotor hub assembly (6) rotates;

odd and even blade assemblies ($O_b$, $E_b$) mounting to and rotating with said rotor hub assembly (6), each of said rotor blade assemblies ($O_b$, $E_b$) having inboard and outboard blade sections (10, 12) defining am internal chamber (64), said outward blade section (12) telescopically mounted to said inboard blade section (10) and being biased outwardly of said rotational axis (8) by centrifugal forces $C_f$ acting thereupon;

said odd and even rotor blade assemblies ($O_b$, $E_b$) each defining a radial length $R_O$ and $R_E$, respectively;

means (70) for positioning said outboard blade sections (12) with respect to said inboard blade sections (10) such that, in the first operating mode, said radial length $R_E$ of said even blade assemblies ($E_b$) is equal to said radial length $R_O$ of said odd blade assemblies ($O_b$), and, in the second operating mode, said radial length $R_E$ is between about 70% to about 95% of said radial length $R_O$, said positioning means (70) including:

a centrifugal restraint assembly (80) disposed in each said internal chamber (64) and disposed in combination with said outboard blade section (12), said centrifugal restraint assembly (80) being biased outwardly of said rotational axis (8) by said centrifugal forces $C_f$ acting on said outboard blade section (12);

a stop surface (64s) formed internally of each said internal chamber (64); and actuation means (90), in combination with said centrifugal forces $C_f$, operative for transpositioning said centrifugal restraint assemblies (80) within said internal chambers (64) such that, in the first operating mode, said centrifugal restraint assemblies (80) are disposed in abutting engagement with said stop surfaces (64s) and, in the second operating mode, said centrifugal restraint assemblies (80) of said even blade assemblies ($E_b$) are disposed in abutting engagement with said actuation means (90).

8. The Variable Diameter Rotor system (4) according to claim 7 wherein each said centrifugal restraint assembly (80) includes:

a retention block (82) disposed in combination with said outboard blade section (12);

a cradle member (84) disposed in sliding combination with an internal wall (64w) of said internal chamber (64); and a connecting means (86) disposed between and mechanically coupling said retention block (82) to said cradle member (84);

said cradle members (84), in the first operating mode, being disposed in abutting engagement with said stop surfaces (64s), and said cradle members ($84_E$) of said even blade assemblies ($E_b$), in the second operating mode, being disposed in abutting engagement with said actuation means (90).

9. The Variable Diameter Rotor system (4) according to claim 8 wherein said actuation means (90) includes:

a ballscrew assembly (92) disposed in each said internal chamber (64), each said ballscrew assembly (92) including:

a threaded ballscrew (94) defining a longitudinal axis (94L) and operative for rotation about said longitudinal axis (94L) in a clockwise and counterclockwise direction; and a ball nut (98) disposed in threaded combination with said threaded ballscrew (94) and radially outboard of said cradle member (84), said ball nut (98), furthermore, operative for translating linearly along said ballscrew (94) in response to rotation thereof and operative for engaging and disengaging said cradle member (84); and drive means for effecting rotation of said threaded ballscrews (94) thereby effecting linear translation of said ball nuts (98).

10. The Variable Diameter Rotor system (4) according to claim 9 wherein said cradle members (84) and the tip end of the outboard blade section (12) define a length dimension L therebetween; and wherein said ball nuts ($98_O$) of said odd blade assemblies ($O_b$) define a radial distance $Rn_O$ from said rotational axis (8), and said ball nuts ($98_E$) of said even blade assemblies ($E_b$) define a radial distance $Rn_E$ from said rotational axis (8), said radial distance $Rn_E$ being between about $0.7Rn_O - 0.3L$ to about $0.95Rn_O - 0.05L$ in the second operating mode.

11. The Variable Diameter Rotor system (4) according to claim 10 wherein said radial distance $Rn_E$ is between about $0.83Rn_O - 0.17L$ to about $0.92Rn_O - 0.08L$ in the second operating mode.

12. The Variable Diameter Rotor system (4) according to claim 10 wherein said stop surfaces ($64s_O$) of said odd blade assemblies ($O_b$) define a radial distance $Rs_O$ from said rotational axis (8), and wherein said stop surfaces ($64s_E$) of said even blade assemblies ($E_b$) define a radial distance $Rs_E$ from said rotational axis (8), said radial distance $Rs_O$ being equal to said radial distance $Rs_E$.

13. A Variable Diameter Rotor system (4) for rotorcraft and operative to reduce Blade-Vortex Interaction (BVI) noise, said rotorcraft operating in first, second and third operating modes, comprising:

a rotor hub assembly (6) defining an axis of rotation (8) about which said rotor hub assembly (6) rotates;

odd and even blade assemblies ($O_b$, $E_b$) mounting to and rotating with said rotor hub assembly (6), each of said rotor blade assemblies ($O_b$, $E_b$) having inboard and outboard blade sections (10, 12) defining an internal chamber (64), said outboard blade section (12) telescopically mounted to said inboard blade section (10) and being biased outwardly of said rotational axis (8) by centrifugal loads $C_f$ acting thereupon;

said odd and even rotor blade assemblies ($O_b$, $E_b$) each defining a radial length $R_O$ and $R_E$ respectively;

means (70) for positioning said outboard blade sections (12) with respect to said inboard blade sections (10), said positioning means (70) further including:

a centrifugal restraint assembly (80) disposed in each said internal chamber (64), each said centrifugal restraint assembly (80) including:

a retention block (82) disposed in combination with said outboard blade section (12);

a cradle member (84) disposed in sliding combination with an internal wall (64w) of said internal chamber (64); and a connecting means (86) disposed between and mechanically coupling said retention block (82) to said cradle member (84);

said cradle members (84) being biased outwardly of said rotational axis (8) by said centrifugal forces $C_f$ acting on said outboard blade section (12);

said cradle members (84) and the tip end of said outboard blade sections (12) defining a length dimension L therebetween;

a stop surface (64s) formed internally of each said internal chamber (64), said stop surfaces ($64s_O$) of said odd blade assemblies ($O_b$), defining a radial distance $Rs_O$ from said rotational axis (8) and said stop surfaces $64s_E$ of said even blade assemblies ($E_b$) defining a radial distance $Rs_E$ from said rotational axis (8), said radial distance $Rs_E$ of said stop surface ($64s_E$) being between about $0.7Rs_O$–$0.3L$ to about $0.95Rs_O$–$0.05L$; and actuation means (90), in combination with said centrifugal forces $C_f$ acting on said outboard blade section (12), operative for transpositioning said cradle members (84) within said internal chambers (64) such that said cradle members (84) are disposed in abutting engagement with said stop surfaces (64s) in one of the operating modes and in abutting engagement with said actuation means (90) in another of said operating modes;

whereby, in the first operating mode, said actuation means (90) is disengaged from said cradle members ($84_E$) of said even blade assemblies ($E_b$) such that said cradle members ($84_E$) thereof are positioned in abutting engagement with said stop surfaces ($64s_E$) of said even blade assemblies ($E_b$), and said actuation means (90) is disposed in abutting engagement with said cradle members ($84_O$) of said odd blade assemblies ($O_b$) such that said odd and even blade assemblies ($O_b$, $E_b$) are fully-extended, and said radial length $R_E$ of said even blade assemblies ($E_b$) is equal to said radial length $R_O$ of said odd blade assemblies ($O_b$);

whereby, in the second operating mode, said actuation means (90) transpositions said cradle members ($84_O$) of said odd blade assemblies ($O_b$) such that said cradle members ($84_O$) thereof are disposed in abutting engagement with said stop surfaces ($64s_O$), said odd and even blade assemblies ($O_b$, $E_b$) alternately vary in length, and said radial length $R_E$ is between about 70% to about 95% of said radial length $R_O$; and whereby, in the third operating mode, said actuation means (90) engages said cradle members (84) of said odd and even blade assemblies ($O_b$, $E_b$) for transpositioning said cradle members (84) thereof such that said odd and even blade assemblies ($O_b$, $E_b$) are fully-retracted and said radial length $R_E$ of said even blade assemblies ($E_b$) is equal to said radial length $R_O$ of said odd blade assemblies ($O_b$).

14. The Variable Diameter Rotor system (4) according to claim 13 wherein said radial distance $Rs_E$ of said stop surface ($64s_E$) is between about $83Rs_O$–$0.17$ L to about $0.92Rs_O$–$0.08L$.

15. The Variable Diameter Rotor system (4) according to claim 13 wherein the second operating mode is a descending flight mode.

16. The Variable Diameter Rotor system (4) according to claim 13 wherein said actuation means (90) includes:

a ballscrew assembly (92) disposed in each said internal chamber (64), each said ballscrew assembly (92) including:

a threaded ballscrew (94) defining a longitudinal axis (94L) and operative for rotation about said longitudinal axis (94L) in a clockwise and counterclockwise direction; and a ball nut (98) disposed in threaded combination with said threaded ballscrew (94) and radially outboard of said cradle member (84), said ball nut (98), furthermore, operative for translating linearly along said ballscrew (94) in response to rotation thereof and operative for engaging and disengaging said cradle member (84); and drive means for effecting rotation of said threaded ballscrews (94) thereby effecting linear translation of said ball nuts (98).

17. The Variable Diameter Rotor system (4) according to claim 16 wherein said ball nuts ($98_b$) of said odd blade assemblies ($O_b$) define a radial distance $Rn_O$ from said rotational axis (8), and said ball nuts ($98_E$) of said even blade assemblies ($E_b$) define a radial distance $Rn_E$ from said rotational axis (8) said radial distance $Rn_O$ being equal to said radial distance $Rn_E$ in the first, second and third operating modes.

18. A Variable Diameter Rotor system (4) for rotorcraft and operative to reduce Blade-Vortex Interaction (BVI) noise, said rotorcraft operating in first, second and third operating modes, comprising:

a rotor hub assembly (6) defining an axis of rotation (8) about which said rotor hub assembly (6) rotates;

odd and even blade assemblies ($O_b$, $E_b$) mounting to and rotating with said rotor hub assembly (6), each of said rotor blade assemblies ($O_b$, $E_b$) having inboard and outboard blade sections (10, 12) defining an internal chamber (64), said outboard blade section (12) telescopically mounted to said inboard blade section (10) and being biased outwardly of said rotational axis (8) by centrifugal forces $C_f$ acting thereupon;

said odd and even rotor blade assemblies ($O_b$, $E_b$) each defining a radial length $R_O$ and $R_E$, respectively;

means (70) for positioning said outboard blade sections (12) with respect to said inboard blade sections (10), said positioning means (70) further including:

a centrifugal restraint assembly (80) disposed in each said internal chamber (64), each said centrifugal restraint assembly (80) including:

a retention block (82) disposed in combination with said outboard blade section (12);

a cradle member (84) disposed in sliding combination with an internal wall (64w) of said internal chamber (64); and a connecting means (86) disposed between and mechanically coupling said retention block (82) to said cradle member (84);

said cradle members (84) being biased outwardly of said rotational axis (8) by said centrifugal forces $C_f$ acting on said outboard blade section (12);

a stop surface (64s) formed internally of each said internal chamber (64), said stop surfaces ($64s_O$) of said odd blade assemblies ($O_b$) defining a radial distance $Rs_O$ from said rotational axis (8), and said stop surfaces ($64s_E$) of said even blade assemblies ($E_b$) defining a radial distance $Rs_E$ from said rotational axis (8), said radial distance $Rs_O$ being equal to said radial distance $Rs_E$; and actuation means (90), in combination with said centrifugal forces $C_f$ acting on said outboard blade section (12), operative for transpositioning said cradle members (84) within said internal chambers (64) such that, in one of the operating modes, said cradle members (84) are disposed in abutting engagement with said stop surfaces (64s) and, in a second operating mode, said cradle members are in abutting engagement with said actuation means (90);

whereby, in the first operating mode, said actuation means (90) is disengaged from said cradle members (84) such that said cradle members (84) are disposed in abutting engagement with said stop surfaces (64s), said odd and even blade assemblies ($O_b$, $E_b$) are fully-extended, and said radial length $R_E$ of said even blade assemblies ($E_b$) is equal to said radial length $R_O$ of said odd blade assemblies ($O_b$);

whereby, in the second operating mode, said actuation means (90) engages said cradle members ($84_E$) of said even blade assemblies ($E_b$) for transpositioning said cradle members ($84_E$) thereof such that said odd and even blade assemblies ($O_b$, $E_b$) alternately vary in length and said radial length $R_E$ is between about 70% to about 95% of said radial length $R_O$; and whereby, in the third operating mode, said actuation means (90) engages said cradle members (84) of said odd and even blade assemblies ($O_b$, $E_b$) for transpositioning said cradle members (84) thereof such that said odd and even blade assemblies ($O_b$, $E_b$) are fully-retracted and said radial length $R_E$ of said even blade assemblies ($E_b$) is equal to said radial length $R_O$ of said odd blade assemblies ($O_b$).

19. The Variable Diameter Rotor system (4) according to claim 18 wherein said actuation means (90), in the second operating mode, transpositions said cradle members ($84_E$) of said even blade assemblies $E_b$ such that said radial length $R_E$ is between about 83% to about 95% of said radial length $R_O$.

20. The Variable Diameter Rotor system (4) according to claim 18 wherein the second operating mode is a descending flight mode.

21. The Variable Diameter Rotor system (4) according to claim 18 wherein said actuation means (90) includes:

a ballscrew assembly (92) disposed in each said internal chamber (64), each said ballscrew assembly (92) including:

a threaded ballscrew (94) defining a longitudinal axis (94L) and operative for rotation about said longitudinal axis (94L) in a clockwise and counterclockwise direction; and a ball nut (98) disposed in threaded combination with said threaded ballscrew (94) and radially outboard of said cradle member (84), said ball nut (98), furthermore, operative for translating linearly along said ballscrew (94) in response to rotation thereof and operative for engaging and disengaging said cradle members (84); and drive means for effecting rotation of said threaded ballscrews (94) thereby effecting linear translation of said ball nuts (98).

22. The Variable Diameter Rotor system (4) according to claim 21 wherein said threaded ballscrews (94) have threads defining a thread pitch, said thread pitch of said odd blade assemblies ($O_b$) being greater than and said thread pitch of said even blade assemblies ($E_b$) thereby effecting a pitch differential therebetween; and wherein said cradle members (84) and the tip end of the outboard blade section (12) define a length dimension L therebetween; and wherein said ball nuts ($98_O$) of said odd blade assemblies ($O_b$) define a radial distance $Rn_O$ from said rotational axis (8), and said ball nuts ($98_E$) of said even blade assemblies ($E_b$) define a radial distance $Rn_E$ from said rotational axis (8), said radial distance $Rn_E$ being between about $0.7Rn_O - 0.3L$ to about $0.95Rn_O 0.05L$ in the second operating mode; and wherein said pitch differential causes said ball nuts ($98_O$, $98_E$) of said odd and even blade assemblies ($O_b$, $E_b$) to traverse at differential linear rates within said internal chambers (64), such that said radial distance $Rn_O$ is equal to said radial distance $Rn_E$ in the third operating mode.

23. The Variable Diameter Rotor system (4) according to claim 21 wherein said drive means (100) drives said threaded ballscrews ($94_O$) of said odd blade assemblies ($O_b$) at an increased rotational speed relative to said threaded ballscrews ($94_E$) of said even blade assemblies ($E_b$), thereby effecting a speed differential therebetween;

wherein said cradle members (84) and the tip end of the outboard blade section (12) define a length dimension L therebetween; and wherein said ball nuts ($98_O$) of said odd blade assemblies ($O_b$) define a radial distance $Rn_O$ from said rotational axis (8), and said ball nuts ($98_E$) of said even blade assemblies ($E_b$) define a radial distance $Rn_E$ from said rotational axis (8), said radial distance $Rn_E$ being between about $0.7Rn_O - 0.3L$ to about $0.95Rn_O 0.05L$ in the second operating mode; and wherein said speed differential causes said ball nuts ($98_O$) of said odd and even blade assemblies ($O_b$, $E_b$) to traverse at differential linear rates within said internal chambers (64), such that said radial distance $Rn_O$ is equal to said radial distance $Rn_E$ in the third operating mode.

\* \* \* \* \*